(12) United States Patent
Matsuzaki et al.

(10) Patent No.: US 8,415,433 B2
(45) Date of Patent: *Apr. 9, 2013

(54) PROCESS FOR PRODUCING POLYMER MICROPARTICLES

(75) Inventors: Hideo Matsuzaki, Aichi (JP); Akihiro Gotou, Aichi (JP); Tomotaka Mizuno, Aichi (JP); Michihiro Kaai, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/375,606

(22) PCT Filed: Jul. 5, 2007

(86) PCT No.: PCT/JP2007/063498
§ 371 (c)(1),
(2), (4) Date: Jan. 29, 2009

(87) PCT Pub. No.: WO2008/015870
PCT Pub. Date: Feb. 7, 2008

(65) Prior Publication Data
US 2010/0069592 A1 Mar. 18, 2010

(30) Foreign Application Priority Data
Aug. 4, 2006 (JP) .................. 2006-212718

(51) Int. Cl.
*C08F 228/02* (2006.01)
*C08F 220/06* (2006.01)

(52) U.S. Cl. ........ 525/243; 525/319; 525/287; 525/255; 525/301; 516/22

(58) Field of Classification Search .................. 526/319, 526/287, 318.4; 525/243, 245, 301, 287; 516/22
See application file for complete search history.

(56) References Cited

U.S. PATENT DOCUMENTS

| | | | | | |
|---|---|---|---|---|---|
| 4,777,232 | A | * | 10/1988 | Heidel | 527/300 |
| 5,369,164 | A | * | 11/1994 | Kroener et al. | 524/458 |
| 8,058,370 | B2 | * | 11/2011 | Hibino et al. | 526/88 |
| 2002/0110690 | A1 | * | 8/2002 | Blankenship | 428/402 |
| 2003/0135172 | A1 | * | 7/2003 | Whitmore et al. | 604/359 |
| 2003/0203011 | A1 | * | 10/2003 | Abuelyaman et al. | 424/445 |
| 2004/0171732 | A1 | * | 9/2004 | Matsuzaki et al. | 524/457 |
| 2005/0014027 | A1 | * | 1/2005 | Karlou-Eyrisch et al. | 428/692 |
| 2011/0021712 | A1 | * | 1/2011 | Gotou et al. | 525/319 |
| 2011/0040060 | A1 | * | 2/2011 | Gotou et al. | 526/348 |
| 2011/0046329 | A1 | * | 2/2011 | Gotou et al. | 526/229 |

FOREIGN PATENT DOCUMENTS

| | | |
|---|---|---|
| JP | 1-213307 | 8/1989 |
| JP | 9-143210 | 6/1997 |
| JP | 11-60616 | 3/1999 |
| JP | 2000-35697 | 2/2000 |

(Continued)

OTHER PUBLICATIONS

Annaka et al Biomacromolecules 2003, 4, 395-403.*

(Continued)

*Primary Examiner* — Mark Kaucher
(74) *Attorney, Agent, or Firm* — Birch, Stewart, Kolasch & Birch, LLP

(57) ABSTRACT

A process for producing polymer microparticles by suspension polymerization of a vinyl-based monomer in which, when polymer microparticles are produced by suspension polymerization of a vinyl-based monomer, a macromonomer having a radically polymerizable unsaturated group at a terminus of a vinyl-based monomer-derived polymer is used as a dispersion stabilizer.

14 Claims, 4 Drawing Sheets

FOREIGN PATENT DOCUMENTS

| | | |
|---|---|---|
| JP | 2003-2934 A1 | 1/2003 |
| JP | 2003-34725 A1 | 2/2003 |
| JP | 2003-245544 A1 | 9/2003 |
| JP | 2004-35747 A1 | 2/2004 |
| JP | 2004-149569 A1 | 5/2004 |
| WO | WO 01/04163 A1 | 1/2001 |

OTHER PUBLICATIONS

Machine Translation of JP 2003-245544.*
International Search Report for International Application No. PCT/JP2007/063498 dated Aug. 2, 2007.

* cited by examiner

PROCESS FOR PRODUCING POLYMER MICROPARTICLES

TECHNICAL FIELD

The present invention relates to a process for producing polymer microparticles. More particularly, the present invention relates to a process for producing by suspension polymerization with good productivity high quality polymer microparticles having a uniform particle size in a specified range in a stable state without causing aggregation, etc. between particles.

BACKGROUND ART

Microsize spherical polymer microparticles are utilized as cosmetic additives, supports for various chemical materials, spacers, column packings for chromatography, light diffusion agents, porosification agents, weight-lightening agents, antiblocking agents, surface modification agents for recording paper, etc.

In particular, hydrophilic crosslinked polymer microparticles can be utilized as hydrogel microparticles, and are useful as cosmetic additives, supports, porosification agents, weight-lightening agents, or surface modification agents for recording paper.

Producing polymer particles by suspension polymerization is conventionally widely carried out, and in particular producing hydrophilic crosslinked polymer particles by inverse phase suspension polymerization is also conventionally known. Conventional techniques for producing hydrophilic crosslinked polymer particles by inverse phase suspension polymerization employ a method in which a copolymer of an 8 or more carbons alkyl ester of acrylic acid and a (meth)acrylic compound having a polar group such as a carboxyl group is used as a dispersing agent (Patent Publications 1 and 2), a method in which a polyethylene oxide-based macromonomer is used (Patent Publication 3), a method in which a silicone compound is used (Patent Publication 4), etc.

However, in these conventional techniques, there are the problems that the dispersion stability of polymer particles during polymerization or after polymerization is not sufficient, the particle size of polymer particles obtained is nonuniform, and the hydrophilicity of polymer particles obtained is degraded. In particular, when hydrophilic crosslinked polymer particles with a high degree of crosslinking are produced by inverse phase suspension polymerization while increasing the proportion of a polyfunctional vinyl-based monomer used, polymerization stability is greatly degraded, and problems such as aggregation of particles, degradation in the quality of polymer particles obtained, and a reduction in productivity easily occur.

(Patent Publication 1) JP-A-1-213307 (JP-A denotes a Japanese unexamined patent application publication.)
(Patent Publication 2) JP-A-11-60616
(Patent Publication 3) JP-A-9-143210
(Patent Publication 4) JP-A-2003-34725
(Patent Publication 5) JP-A-2004-149569
(Patent Publication 6) International Patent Publication WO 01/04163
(Patent Publication 7) JP-A-2000-35697

DISCLOSURE OF INVENTION

Problems to be Solved by the Invention

It is an object of the present invention to provide a process for producing by suspension polymerization, in particular inverse phase suspension polymerization, with good productivity high quality polymer microparticles having a uniform particle size of on the order of a few μm to a few tens of μm while maintaining good dispersion stability without causing aggregation, etc. between particles.

In particular, the present invention provides a suspension polymerization process that can smoothly produce with good productivity high quality polymer microparticles with uniform particle size while maintaining suspension stability with high polymerization stability even when hydrophilic crosslinked polymer microparticles having a high degree of crosslinking are produced.

Means for Solving the Problems

The present inventors have engaged in an intensive investigation in order to attain the above objects. As a result, it has been found that, when producing polymer microparticles by suspension polymerization of a vinyl-based monomer, if suspension polymerization is carried out using a specific macromonomer as a dispersion stabilizer, that is, using as a dispersion stabilizer a macromonomer that is a vinyl-based monomer-derived polymer and has at least one terminus a radically polymerizable unsaturated group, high quality spherical polymer microparticles having a uniform particle size of the order of a few μm to a few tens of μm can be produced with good productivity while maintaining good dispersion stability and polymerization stability without causing aggregation of polymer particles, clumping thereof, adhesion thereof to polymerization equipment, etc. during polymerization or after polymerization.

Furthermore, the present inventors have found that the specific macromonomer is particularly effective as a dispersion stabilizer when producing by inverse phase suspension polymerization hydrophilic polymer microparticles, particularly hydrophilic crosslinked polymer microparticles, and when inverse phase suspension polymerization of a hydrophilic vinyl-based monomer is carried out using the specific macromonomer as a dispersion stabilizer, even in the case of producing hydrophilic crosslinked polymer microparticles having a high degree of crosslinking by using a large amount of a polyfunctional vinyl-based monomer, high quality hydrophilic crosslinked polymer microparticles with a relatively uniform particle size can be obtained with good productivity while maintaining good dispersion stabilizer and polymerization stability without causing aggregation of polymer particles, clumping thereof, adhesion of polymer particles to polymerization equipment, etc.

Furthermore, the present inventors have found that, with regard to the macromonomer used as a dispersion stabilizer during suspension polymerization, and particularly inverse phase suspension polymerization, a macromonomer having an α-substituted vinyl group represented by the formula $H_2C{=}C(X)-$ (in the formula, X denotes a monovalent polar group) at a terminus of a vinyl-based monomer-derived polymer obtained by radical polymerization of the vinyl-based monomer at 150° C. to 350° C. and/or a macromonomer having a (meth)acryloyl group at a terminus of a vinyl-based monomer-derived polymer are suitable due to having an excellent function as a dispersion stabilizer, the macromonomer preferably has a weight-average molecular weight of 1000 to 30000, and the macromonomer preferably has both a hydrophilic vinyl-based monomer-derived constituent unit and a hydrophobic vinyl-based monomer-derived constituent unit, in which case the hydrophobic vinyl-based monomer-derived constituent unit is preferably a constituent unit derived from an 8 or more carbons alkyl ester of (meth)acrylic acid, and the hydrophilic vinyl-based monomer-derived constituent unit is preferably a constituent unit derived from a vinyl-based monomer having a carboxyl group, and the present invention has been accomplished based on those various findings.

That is, the present invention is (1) a process for producing polymer microparticles by suspension polymerization of a vinyl-based monomer, wherein suspension polymerization of the vinyl-based monomer is carried out using as a dispersion stabilizer a macromonomer having a radically polymerizable unsaturated group at a terminus of a vinyl-based monomer-derived polymer.

The present invention is also (2) the production process according to (1) above, wherein the suspension polymerization is inverse phase suspension polymerization; and (3) the production process according to (1) or (2) above, wherein the macromonomer used as a dispersion stabilizer is a macromonomer having an α-substituted vinyl group represented by Formula (I) below at the terminus of the vinyl-based monomer-derived polymer, which is obtained by radical polymerization at 150° C. to 350° C. of the vinyl-based monomer, the vinyl-based monomer being a starting material for production of the macromonomer;

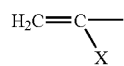
(I)

(in the formula, X denotes a monovalent polar group).

Furthermore, the present invention is (4) the production process according to (1) or (2) above, wherein the macromonomer used as a dispersion stabilizer is a macromonomer having a (meth)acryloyl group at the terminus of the vinyl-based monomer-derived polymer;

(5) the production process according to any one of (1) to (4) above, wherein the macromonomer used as a dispersion stabilizer has a weight-average molecular weight of 1000 to 30000;

(6) the production process according to any one of (1) to (5) above, wherein the macromonomer used as a dispersion stabilizer is a macromonomer having a hydrophobic vinyl-based monomer-derived constituent unit and a hydrophilic vinyl-based monomer-derived constituent unit;

(7) the production process according to (6) above, wherein at least some of the hydrophobic vinyl-based monomer-derived constituent units of the macromonomer are constituent units derived from an 8 or more carbons alkyl ester of (meth)acrylic acid; and (8) the production process according to (6) or (7) above, wherein at least some of the hydrophilic vinyl-based monomer-derived constituent units of the macromonomer are constituent units derived from a vinyl-based monomer having a carboxyl group, and the macromonomer has constituent units derived from the vinyl-based monomer having a carboxyl group at a proportion of 10 to 40 mass % based on the total constituent units forming the macromonomer.

The present invention is also (9) the production process according to any one of (1) to (8) above, wherein the polymer microparticles produced by suspension polymerization have an average particle size of 2 to 100 μm;

(10) the production process according to any one of (1) to (9) above, wherein crosslinked polymer microparticles are produced by using as a vinyl-based monomer for suspension polymerization a monofunctional vinyl-based monomer and a polyfunctional vinyl-based monomer at a molar ratio of monofunctional vinyl-based monomer:polyfunctional vinyl-based monomer=100:0.1 to 100;

(11) the production process according to any one of (1) to (10) above, wherein at least some of the vinyl-based monomer used in the suspension polymerization is a vinyl-based monomer having a polar group selected from a carboxyl group, a sulfonic acid group, and an amido group; and

(12) the production process according to any one of (1) to (11) above, wherein at least some of the vinyl-based monomer used in the suspension polymerization is at least one type selected from (meth)acrylic acid and (meth)acrylamido-2-methylpropanesulfonic acid.

Furthermore, the present invention is

(13) the production process according to any one of (1) to (12) above, wherein the polymer microparticles produced by suspension polymerization are polymer microparticles having a water absorption ratio of 5 to 50 times, an average particle size of 5 to 70 μm in a saturated water-swollen state, and a content ratio of particles having a particle size of 150 μm or greater in a saturated water-swollen state of no greater than 0.3 mass %.

EFFECTS OF THE INVENTION

In accordance with the present invention, carrying out suspension polymerization by using as a dispersion stabilizer a macromonomer that is a vinyl-based monomer-derived polymer and has a radically polymerizable unsaturated group at least one terminus thereof enables high quality spherical polymer microparticles generally having an appropriate particle size of a few μm to a few tens of μm with relatively uniform particle size to be produced with good productivity while maintaining high dispersion stability and polymerization stability and without causing aggregation of polymer particles, clumping thereof, adhesion thereof to polymerization equipment, etc. during polymerization or after polymerization.

The process of the present invention is particularly suitable for inverse phase suspension polymerization using a hydrophilic vinyl-based monomer, and carrying out inverse phase suspension polymerization of a hydrophilic vinyl-based monomer in accordance with the present invention using as a dispersion stabilizer a macromonomer having a radically polymerizable unsaturated group at least one terminus of a vinyl-based monomer-derived polymer enables high quality spherical hydrophilic polymer microparticles with a relatively uniform particle size to be produced with good productivity while maintaining extremely high dispersion stability and polymerization stability without causing aggregation of polymer particles, clumping thereof, adhesion thereof to polymerization equipment, etc. during polymerization or after polymerization. In accordance with the present invention, even when hydrophilic crosslinked polymer microparticles having a high degree of crosslinking are produced using a large amount of polyfunctional vinyl-based monomer, high quality hydrophilic crosslinked polymer microparticles with uniform particle size can be produced with good productivity without causing aggregation of polymer particles, clumping thereof, adhesion thereof to polymerization equipment, etc.

In the process of the present invention, when a macromonomer having an α-substituted vinyl group represented by Formula (I) above at a terminus of a vinyl-based monomer-derived polymer and/or a macromonomer having a (meth) acryloyl group at a terminus of a vinyl-based monomer-derived polymer, obtained by radical polymerization of the vinyl-based monomer at 150° C. to 350° C., are used as the above macromonomer dispersion stabilizer, when a macromonomer having a weight-average molecular weight of 1000 to 30000 is used, and when a macromonomer having a hydrophilic vinyl-based monomer-derived constituent unit (in particular a hydrophilic vinyl-based monomer-derived constituent unit having a carboxyl group) and a hydrophobic vinyl-based monomer-derived constituent unit [in particular a constituent unit derived from an 8 or more carbons alkyl ester of (meth)acrylic acid] is used, the above-mentioned excellent effects of the present invention are more markedly exhibited.

In accordance with the present invention, polymer microparticles (primary microparticles), spherical polymer microparticles free of aggregation, having an average particle size in the range of 2 to 100 μm with uniform particle size can be produced smoothly and, in particular, hydrophilic polymer microparticles having a water absorption ratio of 5 to 50 times, an average particle size of 5 to 70 μm in a saturated water-swollen state, and a content ratio of particles having a particle size of 150 μm or greater in a saturated water-swollen state of no greater than 0.3 mass % can be produced smoothly.

The polymer microparticles obtained by the process of the present invention can be used effectively in applications such as cosmetic additives, supports for various chemical materials, spacers, column packings for chromatography, light diffusion agents, porosification agents, weight-lightening agents, antiblocking agents, and surface modification agents for recording paper.

EXPLANATION OF REFERENCE NUMERALS AND SYMBOLS

Figure 1:
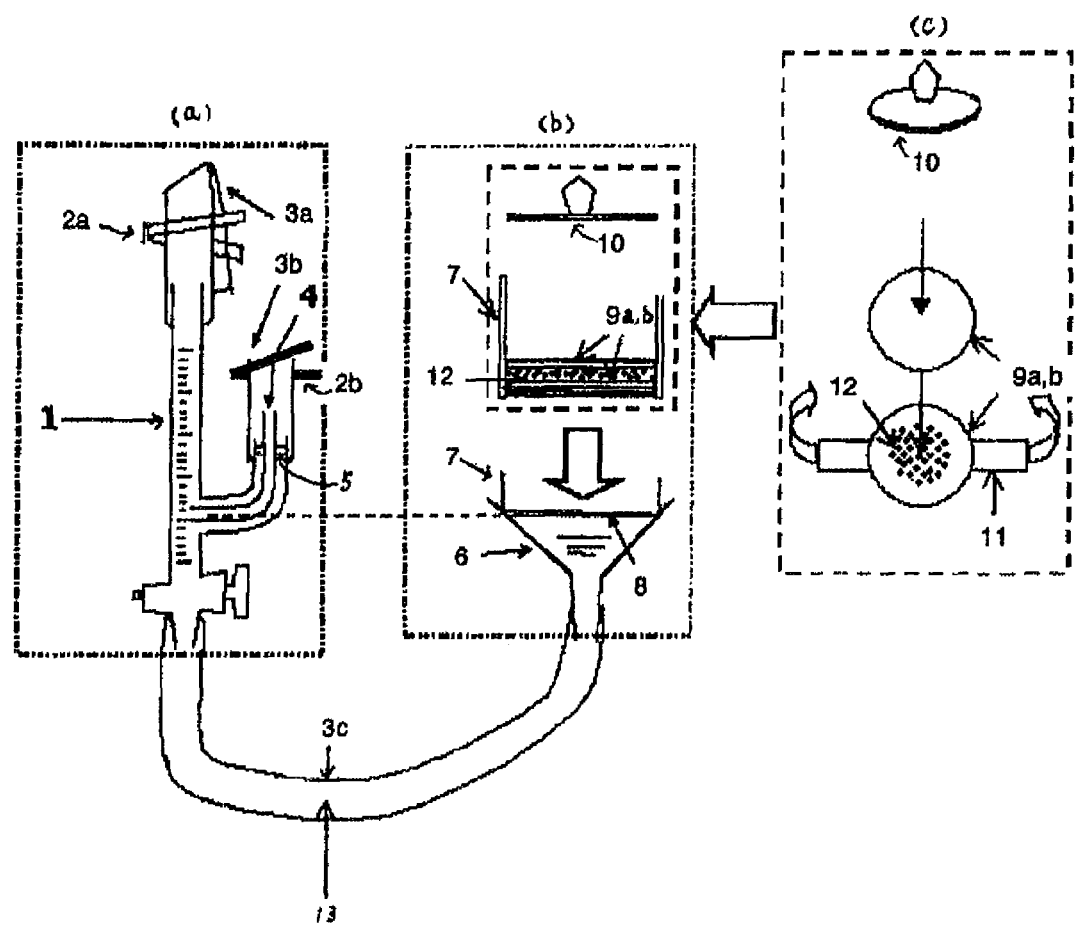
FIG. 1 is a diagram showing equipment used for measurement of water absorption ratio of polymer microparticles.

| 1 | Burette |
| 2 | Pinch cock |
| 3a | Silicon tube |
| 3b | Silicon tube |
| 3c | Silicon tube |
| 4 | Polytetrafluoroethylene tube |
| 5 | Sealing material |
| 6 | Funnel |
| 7 | Bottomed cylinder |
| 8 | Filter paper |
| 9a | Filter paper for sample (polymer microparticles) fixation |
| 9b | Filter paper for sample (polymer microparticles) fixation |
| 10 | Lid |
| 11 | Pressure-sensitive adhesive tape |
| 12 | Sample (polymer microparticles) |
| 13 | Ion-exchanged water |

BEST MODE FOR CARRYING OUT THE INVENTION

The present invention is explained in detail below,

'Suspension polymerization of vinyl-based monomer' in the present invention includes both normal phase suspension polymerization in which an aqueous phase is a dispersion medium and an oil phase is a dispersoid, and inverse phase suspension polymerization in which an oil phase is a dispersion medium and an aqueous phase is a dispersoid.

In general, when carrying out suspension polymerization using a hydrophobic vinyl-based monomer, polymer microparticles are produced by o/w type normal phase suspension polymerization in which an oil phase (the hydrophobic vinyl-based monomer or an oil phase containing the hydrophobic vinyl-based monomer) is suspended as oil droplets in an aqueous phase, whereas when carrying out suspension polymerization using a hydrophilic vinyl-based monomer, polymer microparticles are produced by w/o type inverse phase suspension polymerization in which an aqueous phase (an aqueous solution of the hydrophilic vinyl-based monomer) is suspended as aqueous droplets in an oil phase.

In the present invention, in the case of either normal phase suspension polymerization or inverse phase suspension polymerization, a 'macromonomer having a radically polymerizable unsaturated group at a terminus of a vinyl-based monomer-derived polymer' (hereinafter, this is also called 'macromonomer (M)') is used as a dispersion stabilizer.

The macromonomer (M) used as a dispersion stabilizer in the present invention may have a straight chain structure, or may have a structure with 3 or more branches. When the macromonomer (M) has a straight chain structure, the macromonomer (M) may have a radically polymerizable unsaturated group at only one terminus thereof or may have a radically polymerizable unsaturated group at both termini thereof. When the macromonomer (M) has a structure with 3 or more branches, it may have a radically polymerizable unsaturated group at one or more of the 3 or more termini.

Among them, in the present invention, the macromonomer (M) having a straight chain structure and having a radically polymerizable unsaturated group at only one terminus is preferably used as a dispersion stabilizer since it is easy to produce the macromonomer and its function of stabilizing a dispersion during suspension polymerization is excellent.

The radically polymerizable unsaturated group the macromonomer (M) has at its terminus may be any as long as it is an unsaturated group that can undergo radically polymerization, and examples of the radically polymerizable unsaturated group the macromonomer (M) has at its terminus include an α-substituted vinyl group having a main chain bonded to the α-position of a vinyl group having a polar group X, represented by Formula (I) below;

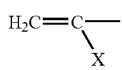

(in the formula, X denotes a monovalent polar group), a (meth)acryloyl group, an allyl group, an isopropenyl group, a maleoyl group, a styryl group, and a vinylbenzyl group.

Among them, the radically polymerizable unsaturated group the macromonomer (M) has at its terminus is preferably an α-substituted vinyl group represented by Formula (I) above [hereinafter, also called an 'α-substituted vinyl group (I)'] or a (meth)acryloyl group since copolymerizability with a vinyl-based monomer when carrying out suspension polymerization of the vinyl-based monomer is excellent and good dispersion stability is obtained. An α-substituted vinyl group (I) is particularly preferable since copolymerizability with a vinyl monomer is excellent and due to low homopolymerizability there is very little possibility that it will be consumed by homopolymerization in the continuous phase.

The 'polar group X' in the α-substituted vinyl group (I) represented by Formula (I) above means a group having an atom other than a carbon atom and a hydrogen atom, or an aryl group, and specific examples of the polar group X include —COOR (R is a hydrogen atom or a monovalent hydrocarbon group), —CONR$_2$ (R is a hydrogen atom or a monovalent hydrocarbon group), —OR (R is a hydrogen atom or a monovalent hydrocarbon group), —OCOR (R is a hydrogen atom or a monovalent hydrocarbon group), —OCOOR (R is a hydrogen atom or a monovalent hydrocarbon group), —NCOOR (R is a hydrogen atom or a monovalent hydrocarbon group), a halogen atom, —CN, a phenyl group, and a phenyl group having a substituent.

Among them, the polar group X is preferably —COOR or —CONR$_2$ since production of the macromonomer (M) can be carried out efficiently and the resulting macromonomer (M) has excellent copolymerizability.

The molecular weight of the macromonomer (M) is preferably 1000 to 30000 as a weight-average molecular weight, and more preferably 2000 to 20000. If the molecular weight of the macromonomer (M) is too low or too high, the function as a dispersion stabilizer is readily degraded.

The weight-average molecular weight of the macromonomer [macromonomer (M)] in the present specification means a weight-average molecular weight on a polystyrene basis determined by gel permeation chromatography (GPC), and its specific method of measurement is as described in the Examples section below.

A main portion of the macromonomer (M) (vinyl-based monomer-derived polymer portion) is formed from one type or two or more types of vinyl-based monomer-derived constituent units, and particularly preferably has both a hydrophobic vinyl-based monomer-derived constituent unit (hereinafter, also called a 'hydrophobic vinyl-based monomer unit') and a hydrophilic vinyl-based monomer-derived constituent unit (hereinafter, also called a 'hydrophilic vinyl monomer unit'). When the macromonomer (M) is formed from both a hydrophobic vinyl-based monomer unit and a hydrophilic vinyl-based monomer unit, it becomes possible for the macromonomer to be present at the interface between a continuous phase (an oil phase or an aqueous phase) and a dispersed phase (an aqueous phase or an oil phase) during suspension polymerization, the dispersion stability of the dispersed phase is further improved, and the probability of the macromonomer (M) copolymerizing with a vinyl-based monomer present in the dispersed phase becomes high. A copolymer formed by copolymerization between the macromonomer (M) and a vinyl-based monomer in the dispersed phase can impart very high dispersion stability to both a dispersed phase and polymer microparticles so formed.

With regard to the macromonomer (M) having both a hydrophobic vinyl-based monomer unit and a hydrophilic vinyl-based monomer unit, its hydrophobic vinyl-based monomer unit is preferably formed from a hydrophobic vinyl-based monomer having a solubility in water at 20° C. of no greater than 2 mass %, and particularly no greater than 0.5 mass %, and this stabilizes the interface between a continuous phase and a dispersed phase to thus further improve dispersion stability during suspension polymerization.

Examples of the monomer having a solubility in water at 20° C. of no greater than 0.5 mass % include propyl methacrylate, butyl acrylate, butyl methacrylate, cyclohexyl acrylate, cyclohexyl methacrylate, 2-ethylhexyl acrylate, 2-ethylhexyl methacrylate, stearyl acrylate, stearyl methacrylate, lauryl acrylate, lauryl methacrylate, isobornyl acrylate, isobornyl methacrylate, dicyclopentenyl acrylate, dicyclopentenyl methacrylate, a perfluoroalkyl acrylate, a perfluoroalkyl methacrylate, benzyl acrylate, benzyl methacrylate, styrene, and α-methylstyrene, and examples of the monomer having a solubility in water at 20° C. of 0.5 to 2.0 mass % include methyl methacrylate, ethyl methacrylate, and propyl acrylate.

The hydrophobic vinyl-based monomer unit of the macromonomer (M) may be formed from one type or two types of the above-mentioned hydrophobic vinyl-based monomers.

When a dispersion stabilizer comprising the macromonomer (M) is used in inverse phase suspension polymerization, in order to enhance affinity with an organic solvent phase forming a continuous phase (normally, a hydrophobic organic solvent phase), the macromonomer (M) preferably has a constituent unit derived from an 8 or more carbons alkyl ester of (meth)acrylic acid as the hydrophobic vinyl-based monomer unit. The structure of the alkyl group may be any of straight chain, branched, and cyclic.

Furthermore, the hydrophilic vinyl-based monomer unit of the macromonomer (M) having a hydrophobic vinyl-based monomer unit and a hydrophilic vinyl-based monomer unit may be formed from a vinyl-based monomer having a hydrophilic group, and examples of the hydrophilic group here include a carboxyl group, a sulfonic acid group, a sulfinic acid group, a phosphoric acid group, a phosphonic acid group, salts thereof, a hydroxy group, an amino group (including a quaternized form thereof and an acid-neutralized form thereof), an amido group, an imido group, a hydrazide group, a urethane group, a ureido group, and a mercaptan group.

Specific examples of the hydrophilic vinyl-based monomer include carboxyl group-containing vinyl-based monomers and vinyl-based monomers having a group that can be converted into a carboxyl group such as unsaturated monobasic acids such as acrylic acid, methacrylic acid, crotonic acid, vinylacetic acid, and acryloxypropionic acid, unsaturated dibasic acids such as maleic acid, fumaric acid, mesaconic acid, citraconic acid, itaconic acid, and cyclohexenedicarboxylic acid, unsaturated acid anhydrides that form a carboxyl group by hydrolysis such as maleic acid anhydride and tetrahydrophthalic acid anhydride; vinyl-based monomers having a hydrophilic group other than a carboxyl group, such as acrylonitrile, acrylamide, methacrylamide, hydroxyethyl acrylate, hydroxyethyl methacrylate, hydroxypropyl acrylate, and hydroxypropyl methacrylate; vinyl-based monomers having a sulfonic acid group or a phosphonic acid group such as allylsulfonic acid, styrenesulfonic acid, vinylsulfonic acid, acrylamido-2-methylpropanesulfonic acid, methacrylamido-2-methylpropanesulfonic acid, allylphosphonic acid, and vinylphosphonic acid; and amino group-containing vinyl-based monomers such as N,N-dimethylaminoethyl (meth)acrylate, N,N-diethylaminoethyl (meth)acrylate, N,N-dimethylaminopropyl (meth)acrylate, and N,N-dimethylaminopropyl (meth)acrylamide, (partially) acid-neutralized forms thereof, and (partially) quaternized forms thereof.

The hydrophilic vinyl-based monomer unit in the macromonomer (M) may be formed from one type or two types of the above-mentioned hydrophilic vinyl-based monomers.

Among them, the macromonomer (M) preferably has as the hydrophilic vinyl-based monomer unit a constituent unit comprising acrylic acid, methacrylic acid, maleic acid, acrylamide, hydroxyethyl acrylate, or hydroxyethyl methacrylate.

When the hydrophilic vinyl-based monomer forming the hydrophilic vinyl-based monomer unit in the macromonomer (M) has an acidic group such as a carboxyl group as the hydrophilic group, at least some of the acidic groups may be neutralized with an alkali (sodium hydroxide, potassium hydroxide, ammonia, an amine compound, etc.) depending on the situation.

When a dispersion stabilizer comprising the macromonomer (M) is used in inverse phase suspension polymerization, the macromonomer (M) preferably has a vinyl-based monomer unit having a carboxyl group as the hydrophilic vinyl-based monomer unit. In this process, the vinyl-based monomer unit having a carboxyl group may be incorporated directly into the macromonomer (M) by producing the macromonomer (M) using the vinyl-based monomer having a carboxyl group, or a carboxyl group may be introduced into the macromonomer by producing a macromonomer using a vinyl-based monomer having a group that can react with a carboxyl group, a carboxylic acid anhydride group, etc. (e.g. a hydroxy group, an epoxy group, an amino group, an oxazoline group, etc.), and then reacting the macromonomer with a compound that forms a carboxyl group (a dicarboxylic acid, a dicarboxylic acid anhydride, etc.). Alternatively, a carboxyl group may be introduced into the macromonomer by synthesizing a macromonomer having a decomposable ester bond-containing (meth)acrylic acid ester as the vinyl-based monomer unit, and then decomposing the ester bond.

The content of the hydrophobic vinyl-based monomer unit and the hydrophilic vinyl-based monomer unit in the macromonomer (M) can be varied depending on the type of suspension polymerization (normal phase suspension polymerization or inverse phase suspension polymerization), the type and composition of the vinyl-based monomer subjected to suspension polymerization, the type of polymer microparticles produced by suspension polymerization, the intended application thereof, etc., but in order to make the macromonomer (M) exhibit well a function as a dispersion stabilizer, the content ratio of the hydrophobic vinyl-based monomer unit is generally 1 to 99 mass % based on the mass of the macromonomer (M), and particularly preferably 5 to 95 mass %, and the content ratio of the hydrophilic vinyl-based monomer unit is 1 to 99 mass %, and particularly preferably 5 to 95 mass %.

When the macromonomer (M) is produced using a vinyl-based monomer, a small amount of a polymer having no radically polymerizable unsaturated group at its terminus (non-macromonomer polymer) might be produced as a by-product together with a macromonomer having a radically polymerizable unsaturated group at its terminus, and since it is difficult to separate the macromonomer from the non-macromonomer polymer, the macromonomer is used as it is in a state containing the non-macromonomer polymer; when the macromonomer (M) used contains a small amount of non-macromonomer polymer, the content ratio of the hydrophobic vinyl-based monomer unit and the content ratio of the hydrophilic vinyl-based monomer unit relative to the macromonomer (M) means a content ratio relative to the mass of the total macromonomer (M) including the non-macromonomer polymer.

In particular, when inverse phase suspension polymerization is carried out using the macromonomer (M) as a dispersion stabilizer, using as a dispersion stabilizer the macromonomer (M) containing the 8 or more carbons alkyl ester of (meth)acrylic acid-derived constituent unit (hydrophobic vinyl-based monomer unit) at a proportion of 30 to 99 mass %, and particularly 60 to 90 mass %, based on the total mass of the macromonomer (M) and the vinyl-based monomer-derived constituent unit having a carboxyl group (hydrophilic vinyl-based monomer unit) at a proportion of 1 to 70 mass %, and particularly 10 to 40 mass %, enables extremely high stabilization effects for the continuous phase and the dispersed phase and excellent polymerization stability to be obtained.

The production process for the macromonomer (M) is not particularly limited, and it may be produced by a conventionally known method (ref. e.g. Patent Publications 5, 6, and 7).

Although not limited thereto, examples of the production process for the macromonomer having an α-substituted vinyl group (I) at its terminus and the macromonomer having a (meth)acryloyl group at its terminus preferably used in the present invention are described below.

[Example of Production Process for Macromonomer Having α-Substituted Vinyl Group (I) at Terminus]

(a) A macromonomer having an α-substituted vinyl group (I) at a terminus of a polymer having a vinyl-based monomer-derived constituent unit can be produced by radical polymerization of a vinyl-based monomer (preferably, the above-mentioned hydrophobic vinyl-based monomer and hydrophilic vinyl-based monomer), which is a starting material for the macromonomer (M), at 150° C. to 350° C., preferably 180° C. to 320° C., and more preferably 190° C. to 270° C.

As a radical source for a radical polymerization reaction, a thermally initiated reaction of a vinyl-based monomer such as styrene or a radical polymerization catalyst may be employed. When a radical polymerization catalyst is used, a conventionally known catalyst may be used, and specific examples thereof include organic peroxides such as benzoyl peroxide, lauroyl peroxide, orthochlorobenzoyl peroxide, orthomethoxybenzoyl peroxide, 3,5,5-trimethylhexanoyl peroxide, t-butylperoxy-2-ethylhexanoate, di-t-butyl peroxide, di-t-hexyl peroxide, di-t-amyl peroxide, and t-butyl peroxypivalate; azo-based compounds such as azobisisobutyronitrile, azobiscyclohexacarbonitrile, and azobis(2,4-dimethylvaleronitrile); and persulfate-based compounds such as potassium persulfate. The amount of radical polymerization catalyst used, relative to 100 parts by mass in total of the vinyl-based monomers for producing the macromonomer, is preferably 0 to 3 parts by mass, more preferably 0.0001 to 1 parts by mass, and yet more preferably 0.001 to 0.5 parts by mass.

Any known radical polymerization method may be employed when carrying out radical polymerization of a vinyl-based monomer, and among them radical polymerization by bulk polymerization or solution polymerization is preferably employed from the viewpoint of a macromonomer being efficiently produced.

Polymerization may be carried out any of batch polymerization, continuous polymerization, semi-batch polymerization (starting material supplied continuously but reaction mixture not extracted continuously), etc., and among them continuous polymerization is preferable from the viewpoint of a macromonomer having a narrow compositional distribution and molecular weight distribution and high homogeneity being obtained. In particular, continuous polymerization using a stirred tank reactor is preferably employed.

(b) When the method (a) above is used, a small amount of polymer having no radically polymerizable unsaturated group at its terminus (non-macromonomer polymer) is often produced as a by-product together with a macromonomer having an α-substituted vinyl group (I) at its terminus, but as described above since it is difficult to separate the non-macromonomer polymer from the macromonomer having a radically polymerizable unsaturated group at its terminus, in the present invention as the macromonomer (M) one containing a small amount of the non-macromonomer polymer is used as it is as a dispersion stabilizer. In order to make the macromonomer (M) fully exhibit a function as a dispersion stabilizer, with regard to the macromonomer (M) used in the present invention, the content ratio of the macromonomer having a radically polymerizable unsaturated group at its terminus is 50 mass % or greater (content ratio of non-macromonomer polymer no greater than 50 mass %), more preferably 70 mass % or greater (ditto no greater than 30 mass %), yet more preferably 80 mass % or greater (ditto no greater than 20 mass %), and particularly preferably 90 mass % or greater (ditto no greater than 10 mass %).

In order to obtain a macromonomer (M) having a high content ratio of a macromonomer having a radically polymerizable unsaturated group at its terminus, in a polymerization system for producing the macromonomer, polymerization is carried out such that the total content of the vinyl-based monomer and the resulting polymer (macromonomer, etc.) is preferably 50 to 100 mass % based on the total mass of the polymerization system, more preferably 60 to 100 mass %, and particularly preferably 70 to 100 mass %, that is, polymerization for producing the macromonomer is carried out such that the content of a solvent in the polymerization system is preferably no greater than 50 mass %, more preferably no greater than 40 mass %, and particularly preferably no greater than 30 mass %.

When a macromonomer is produced using a solvent, one that dissolves a vinyl-based monomer for producing the macromonomer and does not cause the macromonomer produced or other polymers to precipitate is preferably used. Specific examples of the solvent that can be used include aromatic alcohols such as benzyl alcohol, aliphatic alcohols such as isopropanol and butanol, ketones such as methyl ethyl ketone and isobutyl methyl ketone, esters such as butyl acetate, ethylene glycol monoalkyl ethers such as methyl CELLOSOLVE and butyl CELLOSOLVE, diethylene glycol monoalkyl ethers such as carbitol, ethylene glycol dialkyl ethers such as ethylene glycol dimethyl ether, and diglycol alkyl ethers such as diglycol methyl ether.

Furthermore, when the macromonomer (M) is produced by the method (a) above, if it is preferable for a copolymer formed by copolymerization of the macromonomer (M) and a vinyl-based monomer present in a dispersed phase during suspension polymerization to have a high proportion of copolymer having a wide molecular weight distribution and a graft polymer type structure with the vinyl monomer, then it is preferable for the proportion of a vinyl-based monomer having no hydrogen atom at the α-position of the vinyl group to be no greater than 50 mol % as monomer constituting the macromonomer, and more preferably no greater than 30 mol %.

In contrast thereto, if it is preferable for a copolymer formed by copolymerization with a vinyl-based monomer present in a dispersed phase to have a high proportion of copolymer having a narrow molecular weight distribution and a block polymer type structure with the vinyl monomer, then it is preferable for the proportion of a vinyl-based monomer having no hydrogen atom at the α-position of the vinyl group (e.g. having a methyl group at the α-position) to be 30 mol % or greater as monomer constituting the macromonomer, and more preferably 50 mol % or greater.

After suspension polymerization, if it is desirable that a copolymer formed by copolymerization of the macromonomer (M) and a vinyl-based monomer present in a dispersed phase is removed by washing, etc., it is preferable to select the latter case above.

Moreover, when the macromonomer (M) is produced by method (a) above, it is preferable to use a vinyl-based monomer having no hydrogen atom at the α-position of the vinyl group (e.g. having a methyl group at the α-position) as a hydrophobic monomer constituting the macromonomer, and a vinyl-based monomer having a hydrogen atom at the α-position of the vinyl group as a hydrophilic monomer since a dispersion stabilizer suitable for inverse phase suspension polymerization is obtained. This is because a polar group X bonded to a terminal unsaturated bond is derived from a hydrophilic monomer unit, and the terminal unsaturated bond can more easily approach a dispersed phase (hydrophilic) of inverse phase suspension polymerization and can easily undergo copolymerization.

[Example of Production of Macromonomer Having (Meth) Acryloyl Group at Terminus]

(a) A macromonomer having a (meth)acryloyl group at its terminus is produced by producing a polymer having a reactive group (e.g. a carboxyl group, etc.) at a terminus by radical polymerization of a vinyl-based monomer (preferably a hydrophobic vinyl-based monomer and a hydrophilic vinyl-based monomer) by a standard method using a radical polymerization catalyst, and then reacting glycidyl (meth)acrylate, (meth)acryloyl chloride, etc. with the terminal reactive group to thus incorporate a (meth)acryloyl group into the terminus.

(b) In order to obtain a macromonomer having a (meth) acryloyi group at its terminus and having a pendant carboxyl group on a molecular chain in (a) above, radical polymerization using, as part of the vinyl-based monomer for producing the macromonomer, a vinyl-based monomer having a hydroxy group is carried out by a standard method using a radical polymerization catalyst as in (a) above, and after a polymer having a reactive group (e.g. a carboxyl group, etc.) at its terminus and having a pendant hydroxy group on a molecular chain is produced, the terminal reactive group is reacted with glycidyl (meth)acrylate, (meth) acryloyl chloride, etc., and a compound that will form a carboxyl group such as a dicarboxylic acid anhydride is reacted with the pendant hydroxy group on the molecular chain, thus producing a macromonomer having a (meth) acryloyl group at its terminus and having a pendant carboxyl group on a molecular chain. In this process, examples of the vinyl-based monomer having a hydroxy group used for production of the macromonomer include hydroxyethyl (meth)acrylate, hydroxypropyl (meth)acrylate, polyethylene glycol mono(meth)acrylate, polypropylene glycol mono(meth)acrylate, and a compound in which ε-caprolactone is added to hydroxyethyl (meth)acrylate (e.g. Placcel, manufactured by Daicel Chemical Industries, Ltd.).

(c) In the production reaction for a macromonomer in (a) and (b) above, as a production method for a polymer used for producing a macromonomer by introducing a (meth)acryloyl group into a terminus, that is, a polymer having a reactive group (carboxyl group) at a terminus, there can be cited a process for producing a polymer having a carboxyl group at a terminus by subjecting a vinyl-based monomer to radical polymerization in an organic solvent in the presence of a mercaptan having a carboxyl group such as mercaptoacetic acid, mercaptopropionic acid, mercaptobutyric acid, or thiosalicylic acid.

During radical polymerization of a vinyl-based monomer in the presence of a mercaptan having a carboxyl group, the mercaptan functions as a chain transfer agent to thus introduce a carboxyl group into one terminus of a polymer. A preferred amount of mercaptan used is an amount that is equimolar to the polymer obtained by radical polymerization, and can easily be calculated from the amount of monomer used and a desired weight-average molecular weight, etc. When a polymer having a weight-average molecular weight of 1000 to 30,000 is obtained, the amount of mercaptan used is preferably on the order of 0.1 to 5 g per 100 g of the vinyl-based monomer. Furthermore, the polymerization temperature during radical polymerization is preferably 50° C. to 140° C., and as a polymerization solvent, ethyl acetate, butyl acetate, methyl isobutyl ketone, toluene, xylene, n-hexane, cyclohexane, n-heptane, octane, decane, etc. is preferably used. Examples of a polymerization initiator include azobis 2-methylbutyronitrile, azobisisobutyronitrile, azobisdimethylvaleronitrile, t-butyl peroxypivalate, and t-butyl peroxyoctanoate, and a preferred amount thereof used is 0.1 to 3 parts by mass per 100 parts by mass of the vinyl-based monomer.

In the present invention, polymer microparticles are produced by suspension polymerization of a vinyl-based monomer using the above-mentioned macromonomer (M) as a dispersion stabilizer.

As the vinyl-based monomer for suspension polymerization, any radically polymerizable vinyl-based monomer may be used.

As described above, when a vinyl-based monomer subjected to suspension polymerization is a hydrophobic vinyl-based monomer, the macromonomer (M) is used as a dispersion stabilizer, and polymer microparticles are produced by o/w type normal phase suspension polymerization in which an oil phase (hydrophobic vinyl-based monomer or oil phase containing hydrophobic vinyl-based monomer) is suspended as oil droplets in an aqueous phase.

Furthermore, when a vinyl-based monomer subjected to suspension polymerization is a hydrophilic vinyl-based monomer, the macromonomer (M) is used as a dispersion stabilizer, and polymer microparticles are produced by w/o type inverse phase suspension polymerization in which an aqueous phase (aqueous solution in which hydrophilic vinyl-based monomer is dissolved) is suspended as aqueous droplets in an oil phase.

As a hydrophobic vinyl-based monomer used in the o/w type normal phase suspension polymerization, any radically polymerizable hydrophobic vinyl-based monomer may be used, and it is not particularly limited. Specific examples of the hydrophobic vinyl-based monomer that can be used in normal phase suspension polymerization include styrenes such as styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene, acrylic acid and methacrylic acid derivatives such as methyl (meth)acrylate, ethyl (meth)acrylate, propyl (meth)acrylate, n-butyl (meth)acrylate, isobutyl (meth)acrylate, n-octyl (meth)acrylate, 2-ethylhexyl (meth)acrylate, dodecyl (meth)acrylate, lauryl (meth)acrylate, stearyl (meth)acrylate, 2-chloroethyl (meth)acrylate, cyclohexyl (meth)acrylate, isobornyl (meth)acrylate, phenyl (meth)acrylate, benzyl (meth)acrylate, methyl α-chloro(meth)acrylate, dimethylaminoethyl (meth)acrylate, and diethylaminoethyl (meth)acrylate, and vinyl halides such as vinyl chloride, vinylidene chloride, vinyl bromide, and vinyl fluoride, and one type thereof or two or more types thereof may be used.

Furthermore, as the hydrophilic vinyl-based monomer used in the w/o type inverse phase suspension polymerization, any radically polymerizable hydrophilic vinyl-based monomer may be used, and it is not particularly limited. As a hydrophilic vinyl-based monomer that can be used in inverse phase suspension polymerization, for example, a hydrophilic vinyl-based monomer having a hydrophilic group such as a carboxyl group, a sulfone group, a phosphone group, an amido group, an amino group, or a hydroxy group may be used. Specific examples of the hydrophilic vinyl-based monomer that can be used include vinyl-based monomers having a carboxyl group such as acrylic acid, methacrylic acid, crotonic acid, itaconic acid, maleic acid, fumaric acid, monobutyl itaconate, monobutyl maleate, and cyclohexenedicarboxylic acid, and (partially) alkali-neutralized forms thereof; vinyl-based monomers having an amino group such as N,N-dimethylaminoethyl (meth)acrylate, N,N-diethylaminoethyl (meth)acrylate, N,N-dimethylaminopropyl (meth)acrylate, and N,N-dimethylaminopropyl (meth)acrylamide, (partially) acid-neutralized forms thereof, and (partially) quaternized forms thereof; N-vinylpyrrolidone and acryloylmorpholine; vinyl-based monomers having a phosphoric acid group such as acid phosphooxyethyl methacrylate, acid phosphooxypropyl methacrylate, and 3-chloro-2-acid phosphooxypropyl methacrylate and (partially) alkali-neutralized forms thereof; vinyl-based monomers having a sulfonic acid group or a phosphonic acid group such as 2-(meth)acrylamido-2-methylpropanesulfonic acid, 2-sulfoethyl (meth)acrylate, 2-(meth)acryloylethanesulfonic acid, allylsulfonic acid, styrenesulfonic acid, vinylsulfonic acid, allylphosphonic acid, and vinylphosphonic acid and (partially) alkali-neutralized forms thereof; and nonionic hydrophilic monomers such as (meth)acrylamide, A1N-dimethylacrylamide, N-isopropylacrylamide, N-methylol(meth)acrylamide, N-alkoxymethyl(meth)acrylamide, (meth)acrylonitrile, hydroxyethyl (meth)acrylate, and hydroxypropyl (meth)acrylate, and one type or two or more types thereof may be used.

Among them, it is preferable to carry out inverse phase suspension polymerization using one type or two or more types from (meth)acrylic acid, (meth)acrylamide, and 2-acrylamido-2-methylpropanesulfonic acid from the viewpoint of excellent polymerizability and excellent water absorption characteristics of the polymer microparticles obtained.

Furthermore, in the present invention, when carrying out suspension polymerization, as a vinyl-based monomer, a polyfunctional vinyl-based monomer having two or more radically polymerizable unsaturated groups may be used together with one type or two or more types of the above-mentioned monofunctional hydrophobic vinyl-based monomer and hydrophilic vinyl-based monomer in particular, when hydrophilic polymer microparticles are produced by inverse phase suspension polymerization of a hydrophilic vinyl-based monomer using the macromonomer (M) as a dispersion stabilizer, it is preferable to use a polyfunctional vinyl-based monomer together with a monofunctional compound, and hydrophilic crosslinked polymer microparticles having improved strength and shape retention can thereby be obtained.

Therefore, the 'vinyl-based monomer' referred to in the present invention is a general term for a monofunctional vinyl-based monomer and a polyfunctional vinyl-based monomer.

As the polyfunctional vinyl-based monomer, any monomer may be used as long as it is a vinyl-based monomer having two or more groups that are radically polymerizable with a hydrophilic vinyl-based monomer or a hydrophobic vinyl-based monomer as a base; specific examples thereof include di- or tri-(meth)acrylates of polyols such as polyethylene glycol di(meth)acrylate, polypropylene glycol di(meth)acrylate, glycerol tri(meth)acrylate, trimethylolpropane tri(meth)acrylate, and trimethylolpropane ethylene oxide-modified tri(meth)acrylate, bisamides such as methylenebis(meth)acrylamide, divinylbenzene, and allyl (meth)acrylate, and one type or two or more types thereof may be used.

Among them, as a polyfunctional vinyl-based monomer used in inverse phase suspension polymerization, polyethylene glycol diacrylate or methylenebisacrylamide is preferably used since the solubility thereof in a mixed liquid of water and a hydrophilic vinyl-based monomer as a base is excellent, and this is advantageous when the amount thereof used is increased in order to obtain a high degree of crosslinking.

When a polyfunctional vinyl-based monomer is used during suspension polymerization, the proportion of the polyfunctional vinyl-based monomer used can depend on the type of vinyl-based monomer used, the intended application of polymer microparticles obtained by suspension polymerization, etc., and when polymer microparticles require crosslinked characteristics, it is preferably 0.1 to 100 mol relative to 100 mol of the total monofunctional vinyl-based monomer (containing no macromonomer) used in suspension polymerization, more preferably 0.2 to 50 mol, and yet more preferably 0.5 to 10 mol.

In particular, if suspension polymerization is carried out in the presence of a dispersion stabilizer comprising the macromonomer (M) using, as a vinyl-based monomer (monofunctional vinyl-based monomer) on its own or in combination, a (partially) alkali-neutralized form of (meth)acrylic acid and/or a (partially) alkali-neutralized form of 2-acrylamido-2-methylpropanesulfonic acid, which are hydrophilic vinyl-based monomers, and further using at least one type of the above-mentioned polyfunctional vinyl-based monomer (in particular, at least one type from polyethylene glycol diacrylate and methylenebisacrylamide) at a proportion of 0.1 to 100 mol, preferably 0.2 to 50 mol, and particularly 0.5 to 10 mol, per 100 mol of the total monofunctional vinyl-based monomer, crosslinked hydrophilic polymer microparticles having a water absorption ratio of 5 to 50 times, having an average particle size in a saturated water-swollen state of 5 to 70 μm, and for which the proportion of particles showing a particle size in a saturated water-swollen state of 150 μm or greater is no greater than 0.3 mass % can be produced smoothly. Although it is possible to use in combination as the monofunctional vinyl-based monomer a hydrophilic vinyl-based monomer other than the above-mentioned (meth)acrylic acid or 2-acrylamido-2-methylpropanesulfonic acid depending on required characteristics desired for the polymer microparticles, the amount thereof used is preferably no greater than 80 mass % relative to the total amount of monofunctional vinyl monomer, and more preferably no greater than 50 mass %. As the other hydrophilic vinyl-based monomer used in combination, from the viewpoint of good polymerization stability and ease of obtaining polymer microparticles having the above-mentioned characteristics, (meth)acrylamide and hydroxyethyl (meth)acrylate are preferable, and (meth)acrylamide is particularly preferable. Furthermore, when polyethylene glycol diacrylate is used as a polyfunctional vinyl monomer, the average repeat number of ethylene oxide of the polyethylene glycol unit is preferably 2 to 20, and more preferably 3 to 10. As an alkali compound for obtaining a (partially) alkali-neutralized form, an alkali metal hydroxide (sodium hydroxide, potassium hydroxide, etc.), ammonia, or an amine compound may be used. When it is desirable that volatilization of the alkali compound from polymer microparticles is suppressed, it is preferable to use an alkali metal hydroxide, whereas when it is desirable that an alkali compound is removed by volatilization, etc., it is preferable to use ammonia or a low boiling point amine compound. The degree of neutralization of the vinyl-based monomer is preferably 1% to 100%, more preferably 10% to 95%, and particularly preferably 40% to 90%. When a monomer having a carboxyl group or a carboxylic acid salt such as a (partially) neutralized salt of (meth)acrylic acid is used as the vinyl-based monomer, the degree of crosslinking can be increased by using a compound having two or more functional groups that react with a carboxyl group. As such a compound, a polyfunctional epoxy compound is preferable, and ethylene glycol diglycidyl ether and polyethylene glycol diglycidyl ether are particularly preferable. As a method for adding these compounds, there are a method in which they are added to the vinyl-based monomer before polymerization of the monomer and a method in which they are added to a dispersion of polymer microparticles after polymerization, and either may be selected.

Suspension polymerization of a vinyl-based monomer for producing polymer microparticles may be carried out in the same manner as conventionally known suspension polymerization except that the macromonomer (M) is used as a dispersion stabilizer. Suspension polymerization may be carried out by any of a continuous method, a batch method, and a semi-batch method. In the case of a batch method, the vinyl monomer may be polymerized all at once or portionwise.

When o/w type normal phase suspension polymerization is carried out using a hydrophobic vinyl-based monomer, polymer microparticles are produced by carrying out polymerization normally at 10° C. to 100° C. using a radical polymerization catalyst in the presence of a dispersion stabilizer comprising the macromonomer (M) by dispersing as fine oil droplets in an aqueous phase (aqueous dispersion medium) an oil phase comprising a hydrophobic monofunctional vinyl-based monomer on its own or a hydrophobic monofunctional vinyl-based monomer dissolved in an appropriate water-insoluble organic solvent, with a polyfunctional vinyl-based monomer added as necessary.

In this normal phase suspension polymerization, examples of the water-insoluble organic solvent that can be used for dissolving a hydrophobic monofunctional vinyl-based monomer include aliphatic hydrocarbon solvents having 6 or more carbons, aromatic hydrocarbon solvents such as benzene, toluene, and xylene, ketone-based solvents such as methyl isobutyl ketone, and esters such as isoamyl acetate.

Furthermore, the macromonomer (M) is preferably one having high hydrophilicity (the proportion of hydrophilic monomer units is high), and it is preferably added to a polymerization system by dissolving or uniformly dispersing it in a polar solvent such as an alcohol. Moreover, when it is dissolved in water, the macromonomer (M) is preferably one that does not form micelles in water. One forming micelles undergoes an emulsion polymerization reaction at the same time as suspension polymerization, and a large amount of microparticles of 1 μm or less is undesirably formed.

The amount of macromonomer (M) used [the amount used including a small amount of non-macromonomer polymer when it is contained in the macromonomer (M)] is preferably 0.1 to 50 parts by mass relative to a total of 100 parts by mass of vinyl-based monomer (not containing macromonomer) in order to obtain polymer microparticles with uniform particle size while maintaining good dispersion stability, more preferably 0.2 to 20 parts by mass, and yet more preferably 0.5 to 10 parts by mass. When the amount of macromonomer (M) used is too small, the dispersion stability of the vinyl-based monomer and the resulting polymer microparticles in the polymerization system becomes poor, and the polymer microparticles formed easily aggregate, precipitate, and have variation in particle size. On the other hand, when the amount of macromonomer (M) used is too large, the amount of microparticles formed by an emulsion polymerization reaction easily increases.

Furthermore, in this normal phase suspension polymerization, it is preferable to carry out polymerization such that the ratio by mass of aqueous phase (dispersion medium): oil phase (dispersoid) in the polymerization system is 99:1 to 40:60, and particularly 95:5 to 60:40 since a balance can be achieved between productivity, dispersion stability during polymerization, and control of particle size of polymer microparticles.

Moreover, it is preferable to carry out normal phase suspension polymerization while stirring and to carry out polymerization in a state in which oil droplets containing a hydrophobic vinyl-based monomer (oil phase) are dispersed in an aqueous phase (dispersion medium) at a particle size of 1 to 500 μm, and particularly 2 to 100 μm, since polymer microparticles having an appropriate and uniform particle size can be obtained.

On the other hand, when carrying out w/o type inverse phase suspension polymerization using a hydrophilic vinyl-based monomer, hydrophilic polymer microparticles are produced by carrying out polymerization generally at 10° C. to 100° C. using a radical polymerization catalyst in the presence of a dispersion stabilizer comprising the macromonomer (M) by dispersing an aqueous phase, which is an aqueous solution having the hydrophilic vinyl-based monomer (or a neutralized form thereof) dissolved in water, in an oil phase (a dispersion medium comprising a hydrophobic organic solvent) as fine water droplets.

In this inverse phase suspension polymerization, as the hydrophobic organic solvent forming an oil phase (dispersion medium), for example, aliphatic hydrocarbon solvents having 6 or more carbons, aromatic hydrocarbon solvents such as benzene, toluene, xylene, and ethylbenzene, silicone-based solvents such as octamethylcyclotetrasiloxane, etc. may be used, and hexane, cyclohexane, and n-heptane are particularly preferably used since the solubility of the vinyl-based monomer and water therein is small and they are easy to remove after polymerization.

In this inverse phase suspension polymerization, a hydrophilic vinyl-based monomer (or a neutralized salt thereof) may be dissolved in water and added to the polymerization system as an aqueous solution. The concentration of the hydrophilic vinyl-based monomer, added to the polymerization system, in the aqueous solution in which the hydrophilic vinyl-based monomer is dissolved is preferably 5 to 80 mass %, and particularly preferably 20 to 60 mass %, since inverse phase suspension polymerization proceeds smoothly and the productivity is good.

When the hydrophilic vinyl-based monomer used in inverse phase suspension polymerization is a vinyl-based monomer having an acidic group such as a carboxyl group or a sulfonic acid group, an aqueous solution in which the hydrophilic vinyl-based monomer is dissolved well can be prepared by adding the hydrophilic vinyl-based monomer to water, and then neutralizing the acidic group of the vinyl-based monomer with an alkali aqueous solution such as aqueous ammonia, a sodium hydroxide aqueous solution, or a potassium hydroxide aqueous solution.

In this process, it is very preferable to use a polyfunctional vinyl-based monomer [in particular, the above-mentioned specific polyfunctional vinyl-based monomer] together with a monofunctional hydrophilic vinyl-based monomer as the hydrophilic vinyl-based monomer that is dissolved in water and added to the polymerization system.

Furthermore, in this inverse phase suspension polymerization, the macromonomer (M) is preferably dissolved or uniformly dispersed in a hydrophobic organic solvent forming a dispersion medium (oil phase) and added to the polymerization system.

The amount of macromonomer (M) used [the amount used including a small amount of non-macromonomer polymer when the macromonomer (M) contains it] is preferably 0.1 to 50 parts by mass relative to a total of 100 parts by mass of vinyl-based monomer (not containing macromonomer) in order to obtain hydrophilic polymer microparticles with uniform particle size while maintaining good dispersion stability, more preferably 0.2 to 20 parts by mass, and yet more preferably 0.5 to 10 parts by mass. When the amount of macromonomer (M) used is too small, the dispersion stability of the vinyl-based monomer and the resulting polymer microparticles in the polymerization system becomes poor, and the polymer microparticles formed easily aggregate, precipitate, and have variation in particle size. On the other hand, when the amount of macromonomer (M) used is too large, associations (micelles) of the macromonomer easily form, and the amount of by-product microparticles (1 μm or less) formed increases in some cases.

Furthermore, in this inverse phase suspension polymerization, it is preferable to carry out polymerization such that the ratio by mass of oil phase (dispersion medium) aqueous phase (dispersoid) in the polymerization system is 99:1 to 20:80, and particularly 95:5 to 30:70 since a balance can be achieved between productivity, dispersion stability during polymerization, and control of particle size of polymer microparticles.

Moreover, it is preferable to carry out suspension polymerization while stirring and to carry out polymerization in a state in which aqueous droplets containing a hydrophilic vinyl-based monomer (aqueous phase) are dispersed in an oil phase (dispersion medium) at a particle size of 1 to 1000 μm, and particularly 2 to 500 μm, since hydrophilic polymer microparticles having an appropriate and uniform particle size can be obtained.

In the above-mentioned suspension polymerization (normal phase suspension polymerization and inverse phase suspension polymerization), any known radical polymerization catalyst that is used conventionally for radical polymerization of a vinyl-based monomer may be used as a radical polymerization catalyst. Examples of the radical polymerization catalyst that can be used include organic peroxides such as cumene hydroperoxide, t-butyl hydroperoxide, benzoyl peroxide, lauroyl peroxide, orthochlorobenzoyl peroxide, orthomethoxybenzoyl peroxide, 3,5,5-trimethylhexanoyl peroxide, t-butylperoxy-2-ethylhexanoate, di-t-butyl peroxide, and t-butyl peroxypivalate, azo-based compounds such as azobisisobutyronitrile, azobiscyclohexacarbonitrile, and azobis(2,4-dimethylvaleronitrile), and peroxodisulfuric acid salts such as potassium persulfate and ammonium persulfate, and one type or two or more types thereof may be used.

When the suspension polymerization is normal phase suspension polymerization, the radical polymerization catalyst is preferably one that has high solubility in a dispersed phase (oil phase) and for which a radical formed by decomposition thereof has low solubility in water, and is particularly preferably benzoyl peroxide or lauroyl peroxide.

Furthermore, when the suspension polymerization is inverse phase suspension polymerization, one that has high solubility in a dispersed phase (aqueous phase) and for which a radical formed by decomposition thereof has low solubility in a continuous phase (oil phase) is preferable, and a peroxodisulfuric acid salt such as potassium persulfate or ammonium persulfate or a hydroperoxide compound such as t-butyl hydroperoxide or cumene hydroperoxide is particularly preferable. The decomposition of the initiator (formation of a radical) may employ heat or a redox reaction with a reducing compound. It is preferable to utilize a redox reaction since it is possible to initiate polymerization at low temperature, and it is also possible to increase the concentration of a vinyl-based monomer in a polymerization reaction liquid and increase the polymerization rate, thus making it possible to increase productivity and the molecular weight of a polymer formed. As a reducing compound used for initiating redox, any conventionally used known reducing compound may be used, and sodium sulfite, sodium hydrogen sulfite, and sodium hydrosulfite, which are water soluble, are preferable. These reducing compounds are preferably added as an aqueous solution after adding a dispersed phase (aqueous phase) to a continuous phase (oil phase) and dispersing the dispersed phase at a desired particle size. As an oxidizing agent when utilizing a redox reaction, any of the above-mentioned peroxides and peroxodisulfuric acid salts may be used; one that is soluble in both an oil phase and an aqueous phase is preferable since a good polymerization rate is obtained, and a hydroperoxide compound such as t-butyl hydroperoxide or cumene hydroperoxide is particularly preferable.

The amount of radical polymerization initiator used may be adjusted according to the type of vinyl-based monomer used, the particle size or molecular weight of polymer microparticles, etc., and it is generally preferably, relative to the total mass of vinyl-based monomers, 0.001 to 5 mass %, and particularly preferably 0.01 to 1 mass %. When the amount of radical polymerization catalyst used is too small, the yield of polymer microparticles might degrade, whereas when it is too large, the molecular weight of the polymer decreases, the strength or water absorbability of polymer microparticles might be insufficient, the polymerization rate becomes too high, and suspension polymerization cannot be carried out stably in some cases.

In the suspension polymerization (normal phase suspension polymerization and inverse phase suspension polymerization) of the present invention, together with the dispersion stabilizer comprising the macromonomer (M), another dispersion stabilizer may be used in combination as necessary. In particular, when adjusting the polymer microparticles to a desired particle size, it can be effective to use the other dispersion stabilizer in combination.

Specific examples of the other dispersion stabilizer that can be used in the present invention when the suspension polymerization is normal phase suspension polymerization include sparingly water-soluble inorganic salts such as sparingly water-soluble tertiary calcium and pyrophosphate salts, hydrophilic polymers such as polyvinyl alcohol, carboxymethylcellulose, and sodium polyacrylate, anionic surfactants such as sodium laurylsulfate and sodium dodecylbenzenesulfonate, nonionic surfactants such as polyoxyethylene lauryl ether, and cationic surfactants such as trimethylstearylammonium chloride.

On the other hand, specific examples of the other dispersion stabilizer that can be used when the suspension polymerization is inverse phase suspension polymerization include nonionic surfactants such as sorbitan fatty acid esters, polyglycerol fatty acid esters, sucrose fatty acid esters, sorbitol fatty acid esters, and polyoxyethylene alkyl ethers. It is particularly preferable to use a relatively highly hydrophobic nonionic surfactant having an HLB of 2 to 10, such as sorbitan monooleate or sorbitan monopalmitate, and one type thereof or two or more types thereof may be used.

When the other dispersion stabilizer is used together with the dispersion stabilizer comprising the macromonomer (M), the amount of the other dispersion stabilizer used is preferably 0.01 to 20 parts by mass relative to 100 parts by mass of the vinyl-based monomer, and particularly preferably 0.1 to 10 parts by mass. When the amount of the other dispersion stabilizer used is too large, the dispersion stability during suspension polymerization might degrade, or the amount of fine particles of 1 µm or less formed as a by-product might increase.

A dispersion in which polymer microparticles are dispersed in a liquid is obtained by carrying out suspension polymerization of a vinyl-based monomer as above. A method for collecting polymer microparticles from the dispersion is not particularly limited, and it may be carried out by a conventionally known method. As a method for collecting polymer microparticles, there can be cited for example (1) a method in which a dispersion containing polymer microparticles is subjected as it is to heating and/or a vacuum treatment so as to remove a volatile portion such as a liquid solvent, thus giving dried polymer microparticles, (2) a method in which a dispersion of polymer microparticles is subjected to sedimentation, centrifugation, decantation, filtration, etc. to thus collect polymer microparticles, which are subjected to washing as necessary so as to remove a dispersion stabilizer, unreacted vinyl-based monomer, etc., and are dried to give polymer microparticles, etc. Washing polymer microparticles collected from a dispersion before drying is desirable from the viewpoint of improvement of the purity, improvement of the dispersibility, etc. of the polymer microparticles.

In the case of inverse phase suspension polymerization, since water is contained in the polymer microparticles forming a dispersed phase, it is preferable to remove the water in the polymer microparticles by carrying out azeotropic dehydration, etc. in advance before drying the polymer microparticles, and then carry out drying. Drying after removing water in advance prevents fusion between polymer microparticles during drying, thus giving polymer microparticles having excellent dispersibility.

Drying of polymer microparticles is generally preferably carried out at a dispersion or dried particulate powder temperature of 40° C. to 100° C., and particularly preferably 50° C. to 90° C.

In accordance with the suspension polymerization process of the present invention described above, high quality spherical polymer microparticles having an appropriate particle size in a specified range with uniform particle size can be produced with good productivity in a stable state without causing aggregation of polymer particles, clumping thereof, adhesion thereof to polymerization equipment, etc.

The polymer microparticles obtained by the process of the present invention in which suspension polymerization of a vinyl-based monomer is carried out using the macromonomer (M) as a dispersion stabilizer generally have an average particle size of 2 to 100 µm.

In the present invention, when the inverse phase suspension polymerization process is carried out by employing conditions such that a macromonomer having in particular an α-substituted vinyl group or an acryloyl group is used, the weight-average molecular weight of the macromonomer is 1000 to 30000, and the macromonomer has a constituent unit derived from an 8 or more carbons alkyl ester of (meth)acrylic acid and a vinyl monomer unit having a carboxyl group, it is possible to obtain spherical polymer microparticles having an average particle size in the range of 2 to 100 µm and having uniform particle size (having very few coarse particles).

In accordance with the process of the present invention, polymer microparticles (hydrophilic polymer microparticles) having a water absorption ratio of 5 to 50 times, an average particle size of 5 to 70 µm in a saturated water-swollen state, and a proportion of particles having a particle size of 150 µm or greater in a saturated water-swollen state of no greater than 0.3 mass % can be produced smoothly.

In particular, by carrying out suspension polymerization using as a vinyl-based monomer (monofunctional vinyl-based monomer) a (partially) alkali-neutralized form of (meth)acrylic acid or a (partially) alkali-neutralized form of 2-acrylamido-2-methylpropanesulfonic acid, which are hydrophilic vinyl-based monomers, at 50 mass % or greater of the total amount of monofunctional vinyl-based monomer, and further using at least one type of the above-mentioned polyfunctional vinyl-based monomer (in particular, at least one type of polyethylene glycol diacrylate or methylenebisacrylamide) at a proportion relative to a total of 100 mol of monofunctional vinyl-based monomer of 0.1 to 100 mol, furthermore 0.2 to 50 mol, and particularly 0.5 to 10 mol, and the macromonomer (M) at a proportion relative to the total mass of vinyl-based monomer of 0.1 to 50 mass %, and particularly 0.5 to 10 mass %, hydrophilic polymer microparticles having a water absorption ratio of 5 to 50 times, an average particle size of 5 to 70 µm in a saturated water-swollen state, and a proportion of particles having a particle size of 150 µm or greater in a saturated water-swollen state of no greater than 0.3 mass % can be produced smoothly.

Furthermore, the particle size of the polymer microparticles formed by suspension polymerization can be adjusted by adjusting the stirring conditions of the polymerization system during suspension polymerization.

Here, the average particle size of the polymer microparticles (dried polymer microparticles), the water absorption ratio of the polymer microparticles, the average particle size in a saturated water-swollen state, and the proportion of particles having a particle size of 150 µm or greater in a saturated water-swollen state referred to in the present specification are values measured or obtained by methods described in the Examples section below.

EXAMPLES

The present invention is specifically explained below by reference to Examples, etc., but the present invention is not limited to the Examples below.

In the Examples below, solids concentration in a liquid, weight-average molecular weight and number-average molecular weight of a macromonomer, percentage introduction of terminal ethylenically unsaturated group (terminal ethylenically unsaturated bond percentage introduction) in a macromonomer having an α-substituted vinyl group, extent of adhesion of polymer microparticles to a polymerization reactor, amount of residue remaining on a polyethylene filter cloth (200 mesh; mesh opening 114 µm) from a dispersion of polymer microparticles obtained by suspension polymerization, average particle size of polymer microparticles, water absorption ratio of polymer microparticles, average particle size of polymer microparticles in a saturated water-swollen state, and proportion of particles having a particle size of 150 µm or greater of polymer microparticles in a saturated water-swollen state were measured and evaluated as follows.

(1) Solids concentration in liquid:

About 1 g of a sample liquid containing a solids portion was collected in a weighing bottle whose weight had been measured [weight of weighing bottle=B (g)] and the entire weighing bottle was precisely weighed [$W_0$ (g)], the weighing bottle with the sample liquid was put within a windless dryer and dried at 150° C. for 1 hour, the weight of the entire weighing bottle was then measured [$W_1$ (g)], and a solids concentration (NV) (mass %) was determined from Equation (I) below.

$$\text{Solids concentration } (NV) \text{ (mass \%)} = \{(W_1-B)/(W_0-B)\} \times 100 \quad (1)$$

(2) Weight-average molecular weight (Mw) and number-average molecular weight (Mn) of macromonomer:

The molecular weight of a macromonomer (when a small amount of non-macromonomer polymer was contained, macromonomer containing non-macromonomer polymer) was measured by gel permeation chromatography (GPC), and a weight-average molecular weight (Mw) and a number-average molecular weight (Mn) of the macromonomer were determined on a polystyrene basis.

Specifically, an 'HLC-8120 GPC' manufactured by Tosoh Corporation was used as GPC equipment, TSKgel super MP-M (4 columns) were used as columns, a solution in which a macromonomer was dissolved in tetrahydrofuran solvent (concentration 5 mg/mL) was used as a sample, tetrahydrofuran was used as a developing solvent, and measurement was carried out under conditions of a flow rate of 0.6 mL/min and a column temperature of 40° C. Measurement results were analyzed using a calibration curve produced with standard polystyrene, and a weight-average molecular weight (Mw) and a number-average molecular weight (Mn) of the macromonomer (macromonomer composition) on a polystyrene basis were determined.

(3) Percentage introduction (F) of terminal ethylenically unsaturated group into macromonomer having α-substituted vinyl group:

With regard to a macromonomer having an α-substituted vinyl group (when a small amount of non-macromonomer polymer was contained, macromonomer containing non-macromonomer polymer) produced by the process described in Production Example 1, from the constituent monomer composition of the macromonomer determined by the method described in Example 1, and Mn determined from (2) above, the number of protons of methylene groups bonded to the ester bonds of (meth)acrylic acid ester units contained in one macromonomer was defined as a (counts).

From a $^1$H-NMR spectrum of the macromonomer measured using an 'EX-270' manufactured by JEOL, the area of a peak due to protons of methylene groups bonded to ester bonds of (meth)acrylic acid ester units was calculated as a, and the area of a peak due to protons of terminal ethylenically unsaturated groups was defined as b.

The average number of terminal ethylenically unsaturated groups per macromonomer molecule, defined as f, was calculated from Equation (II) below using a and b.

$$f = b/(a \times 2) \quad \text{(II)}$$

Furthermore, F (%), defined as the percentage introduction of terminal ethylenically unsaturated groups, was determined from Equation (III) below.

$$F = f \times 100 \quad \text{(III)}$$

(4) Extent of adhesion of polymer microparticles to polymerization reactor:

When a suspension of polymer microparticles formed by suspension polymerization (inverse phase suspension polymerization) was collected from a polymerization reactor, the state within the polymerization reactor was visually examined, and the extent of adhesion of polymer microparticles was evaluated according to the evaluation criteria shown in Table 1 below.

TABLE 1

| Symbol | Evaluation details |
| --- | --- |
| A | Only a few polymer microparticles adhered to the vicinity of the liquid level of the polymerization reactor, there was no adhesion to walls of the polymerization reactor. |
| B | Polymer microparticles adhered to the vicinity of the liquid level of the polymerization reactor only as a thin band, there was no adhesion to walls of the polymerization reactor. |
| C | Polymer microparticles adhered to the vicinity of the liquid level of the polymerization reactor as a thick band. |
| D | A large amount of polymer microparticles adhered to the liquid level of the polymerization reactor and walls of the polymerization reactor. |

(5) Amount of residue on polyethylene filter cloth (200 mesh; mesh opening 114 μm) from dispersion of polymer microparticles:

A dispersion of polymer microparticles obtained by suspension polymerization was filtered using a polyethylene filter cloth (200 mesh; mesh opening 114 μm, 'NIPPU strong mesh 200 mesh' manufactured by NBC), the mass of residue such as polymer remaining on the polyethylene filter cloth was measured after drying at 40° C. for 24 hours, and the proportion (mass %) relative to the mass of the polymer microparticle dispersion used for filtration was determined.

(6) Average particle size of polymer microparticles:
(i) 0.02 g of a sample (dry powder of polymer microparticles obtained by removing part of volatile components by the method described in the Examples from a dispersion obtained by polymerization) was weighed, 20 mL of n-heptane was added thereto, and stirring was carried out well so as to achieve a uniform dispersion in n-heptane.
(ii) The n-heptane dispersion obtained in (i) above was subjected to particle size distribution measurement using a laser diffraction scattering type particle size distribution analyzer ('MT-3000' manufactured by Nikkiso Co., Ltd.). n-Heptane was used as a circulation dispersion medium during measurement. The n-heptane dispersion was poured into the circulation dispersion medium, and measurement was carried out after ultrasonic waves were applied at an output of 25 w for 1 minute by an ultrasonic homogenizer built into the equipment. The refractive indexes of the dispersion medium and the sample were 1.39 and 1.53 respectively. A median diameter (μm) calculated from a volume-basis particle size distribution was defined as the average particle size of the polymer microparticles.

(7) Water absorption ratio of polymer microparticles:
(i) The water absorption ratio of polymer microparticles was measured as follows using the equipment shown in FIG. 1. In FIG. 1, 1 denotes a burette equipped with a branch tube for introducing air, 2a and 2b denote a pinch cock, 3a, 3b, and 3c denote a silicon tube, 4 denotes a polytetrafluoroethylene tube, 5 denotes a sealing material for fixing the polytetrafluoroethylene tube 4 to the branch tube, 6 denotes a funnel, 7 denotes a bottomed cylinder (for support) with a large number of holes in the bottom, 8 denotes a filter paper ('ADVANTEC No. 2 filter paper' manufactured by Advantec, diameter=55 mm), 9a and 9b denote a filter paper (both filter papers being 'ADVANTEC No. 2 filter paper' manufactured by Advantec, diameter=55 mm) for fixing a sample (polymer microparticles), 10 denotes a lid (diameter=55 mm, weight=9 g), 11 denotes a pressure-sensitive adhesive tape, 12 denotes a sample (polymer microparticles), and 13 denotes ion-exchanged water.
(ii) Measurement method:
(a) A section from a lower part of the branch tube of the burette 1 through the silicon tube 3c to the face of the filter paper 8 placed in the perforated bottom of the bottomed cylinder 7 placed within the funnel 6 was filled with ion-exchanged water, and a cock in a lower part of the burette 1 and the pinch cock 2b of the branch tube were closed. Subsequently, the pinch cock 2 above the burette was removed to thus supply the ion-exchanged water 13 up to an upper part of the burette 1 through the silicon tube 3a mounted on the upper part of the burette 1. After supplying, the pinch cock 2a was closed, and subsequently the cock in the lower part of the burette and the pinch cock 2b were opened. In this way, a section from the upper part of the burette 1 to the filter paper 8 was filled with ion-exchanged water, and the same volume of air as that of ion-exchanged water supplied to a sample via the filter paper 8 was introduced into the burette 1 through the polytetrafluoroethylene tube 4 placed within the branch tube.
(b) Subsequently, surplus ion-exchanged water 13 exuding from the surface of the filter paper 8 was removed from the surface of the filter paper using commercial kitchen paper, and immediately thereafter the scale reading ($w_1$) of the burette 1 was recorded.
(c) 0.1 to 0.2 g of a sample for measurement [a dry powder of polymer microparticles obtained by removing part of volatile components by the method described in the Examples from a dispersion of polymer microparticles obtained by polymerization and stored in a sealed glass bottle, the solids portion value of the sample measured by the method of (1) above being defined as NV (mass %)] was collected and precisely weighed ($w_0$) and, as shown in FIG. 1 (c), placed evenly on a central part of the filter paper 9a, another filter paper 9b was placed so as to cover the top thereof, and the sample 12 was fixed by fastening the filter papers 9a and 9b by means of the adhesive tape 11.
(d) The sample 12 fixed between the filter papers 9a and 9b in (c) above was placed on the filter paper 8 placed on the perforated bottom part of the bottomed cylinder 7 together with the filter papers 9a and 9b, immediately thereafter the lid 10 was placed thereon, and when 30 minutes had elapsed in that state, the scale reading ($w_2$) of the burette 1 was recorded.

The total amount of ion-exchanged water 13 absorbed by the sample and the two sheets of filter paper 9a and 9b (total water absorption amount) ($w_3$) was determined from $w_3 = w_2 - w_1$.
(e) The same procedures as in (a) to (c) above were carried out except that a sample was not sandwiched between the filter papers 9a and 9b, the total amount of ion-exchanged water 13 absorbed by the two sheets of filter paper 9*a* and 9*b* (total water absorption amount) ($w_4$) was determined, and the water absorption ratio (times) of the sample (polymer microparticles) was calculated from Equation (IV) below.

$$\text{Water absorption ratio of polymer microparticles (times)} = (w_3-w_4)/\{w_0(NV/100)\}+100/NV \quad \text{(IV)}$$

(8) Average particle size of polymer microparticles in saturated water-swollen state:

(i) 0.02 g of a sample (dry powder of polymer microparticles obtained by removing volatile components by the method described in the Examples from a dispersion obtained by polymerization) was weighed, 20 mL of ion-exchanged water was added thereto, stirring was carried out well so as to achieve a uniform dispersion in water, and it was then allowed to stand at a temperature of 25° C. for 1 hour so that the polymer microparticles were swollen by ion-exchanged water until in a saturated state.

(ii) The aqueous dispersion in a saturated swollen state obtained in (i) above was subjected to particle size distribution measurement using a laser diffraction scattering type particle size distribution analyzer ('MT-3000' manufactured by Nikkiso Co., Ltd.). Ion-exchanged water was used as a circulation dispersion medium during measurement. The aqueous dispersion was poured into the circulation dispersion medium, and measurement was carried out after ultrasonic waves were applied at an output of 25 w for 1 minute by an ultrasonic homogenizer built into the equipment. The refractive indexes of the dispersion medium and the sample were 1.33 and 1.53 respectively. A median diameter (μm) calculated from a volume-basis particle size distribution was defined as the average particle size of the polymer microparticles in a saturated water-swollen state.

(9) Proportion of particles having particle size of 150 μm or greater in saturated water-swollen state:

In accordance with JIS K 0069-1992 (test method for sieving of chemical products), the proportion of particles having a particle size of 150 μm or greater in a saturated water-swollen state was determined by a wet sieving residue method.

Specifically, 50 g of a sample for measurement (a dry powder of polymer microparticles obtained by removing volatile components by the method described in the Examples from a dispersion of polymer microparticles obtained by polymerization and stored in a sealed glass bottle, the solids portion value of the sample measured by the method of (1) above being defined as NV (mass %)) was weighed, 50 g of ethanol was added thereto to break it up well, it was then poured gradually into 3 L of ion-exchanged water while stirring, and stirring was carried out for 60 minutes so that ion-exchanged water was absorbed up to a saturated swollen state. Subsequently, after confirming that saturation-swollen polymer microparticles were uniformly dispersed, the aqueous dispersion was poured over a sieve with a mesh opening of 150 μm (diameter 70 mm) and made to pass therethrough, and a residue on the sieve was washed with a sufficient amount of ion-exchanged water while taking care that the residue did not spill. Subsequently, the sieve with the residue was placed in a circulation dryer, dried at 150° C., and then allowed to cool within a desiccator, and the weight of the sieve after cooling (total mass of sieve and residue) ($W_1$) was measured, and the proportion of particles having a particle size of 150 μm or greater in a saturated water-swollen state [hereinafter, also called 'content of saturated water-swollen particles (150 μm or greater)'] was determined from Equation (V) below.

$$\text{Content of saturated water-swollen particles (150 μm or greater) (mass \%)} = \{(W_1-W_0)/(W_R \times NV/100)\} \times 100 \quad \text{(V)}$$

[in the equation, $W_0$ denotes the mass (g) of the sieve on its own when dry, $W_1$ is the total mass (g) of the sieve and the residue after drying, and $W_R$ denotes the mass (50 g) of a sample (dried polymer microparticles).]

PRODUCTION EXAMPLE 1

Production of Macromonomer (M-1)

(1) A starting material tank was charged with a vinyl-based monomer mixed liquid containing 75.0 parts by mass of lauryl methacrylate (hydrophobic vinyl-based monomer), 25.0 parts by mass of acrylic acid (hydrophilic vinyl-based monomer), 10.0 parts by mass of methyl ethyl ketone (polymerization solvent), and 0.45 parts by mass of tertiary butyl peroxide (radical polymerization catalyst).

(2) The temperature of an oil jacket of a 1000 mL capacity pressurized stirred tank reactor was maintained at 240° C., supply of the vinyl-based monomer mixed liquid within the starting material tank prepared in (1) above to the reactor was started, and supply of the vinyl-based monomer mixed liquid to the reactor and extraction of a reaction mixture liquid from the reactor were carried out continuously such that the amount of vinyl-based monomer mixed liquid within the reactor was 580 g and the average residence time was 12 minutes. While continuously supplying the vinyl-based monomer mixed liquid, the reactor internal temperature was adjusted to 235° C. and the reactor internal pressure was adjusted to 1.1 MPa. The reaction mixture liquid extracted from the reactor was depressurized to 20 kPa and continuously supplied to a thin-film evaporator maintained at 250° C. to thus remove unreacted vinyl-based monomer or solvent, etc. by distillation, and macromonomer was discharged from the thin-film evaporator. The vinyl-based monomer or solvent, etc. removed by the thin-film evaporator was cooled in a condenser and collected as a liquid distillate. The point at which 60 minutes had elapsed after supply of the vinyl-based monomer mixed liquid to the reactor was started and the reactor internal temperature became stable at 235° C. was defined as the starting point for collecting macromonomer from the thin-film evaporator; the reaction was continued for 48 minutes from the collection starting point, and the macromonomer obtained during this period was collected [hereinafter, this was called 'macromonomer (M-1)']. During this period, 2.34 kg of the vinyl-based monomer mixed liquid was supplied to the reactor, 1.92 kg of the macromonomer (M-1) was collected from the thin-film evaporator, and 0.39 kg of the distillate was collected in a distillation tank.

(3) The distillate collected in (2) above was analyzed by gas chromatography ('GC-390B' manufactured by GL Sciences Inc.), and it was found that 100 parts by mass of the distillate contained 31.1 parts by mass of lauryl methacrylate, 16.4 parts by mass of acrylic acid, and 52.5 parts by mass of solvent and others.

(4) (i) From the amount of vinyl-based monomer mixed liquid supplied to the reactor, the composition of the vinyl-based monomer mixed liquid, the amount of macromonomer (M-1) collected, the amount of distillate collected, and the composition of the distillate, the reaction conversion of the vinyl-based monomer was calculated as 90.0 mass %, and the constituent unit composition of the macromonomer (M-1) was calculated as lauryl methacrylate:acrylic acid=76.0:24.0 (ratio by mass).

(ii) When the molecular weight of the macromonomer (M-1) collected in (2) above was determined by the method above, the weight-average molecular weight (Mw) was 3800, and the number-average molecular weight (Mn) was 1800.

(iii) When the percentage introduction of terminal ethylenically unsaturated group in the macromonomer (M-1) collected in (2) above was determined by the method above, it was 97%.

PRODUCTION EXAMPLES 2 to 7

Production of Macromonomers (M-2) to (M-7)

(1) The same procedures as in (1) and (2) of Production Example 1 were carried out except that the mixture composition of the vinyl-based monomer mixed liquid and the reaction internal temperature during polymerization were changed as described in Table 2, thus giving macromonomers (macromonomer compositions) [the macromonomers obtained thereby were called macromonomers (M-2), (M-3), (M-4), (M-5), (M-6), and (M-7)].

(2) With regard to the macromonomers (M-2) to (M-7) obtained in (1) above, the weight-average molecular weight (Mw), the number-average molecular weight (Mn), and the percentage introduction of terminal ethylenically unsaturated group were determined by the methods above and found to be as shown in Table 2 below.

water bath under a flow of nitrogen. After the reactor internal temperature became stable at 90° C., 0.88 parts by mass of azobis 2-methylbutyronitrile and 1.5 parts by mass of 3-mercaptopropionic acid were added thereto, subsequently a vinyl-based monomer mixture containing 86.2 parts by mass of lauryl methacrylate and 7.8 parts by mass of 2-hydroxyethyl methacrylate was added dropwise while maintaining the reactor internal temperature at 90° C., thus carrying out radical polymerization, and a solution of a polymer having a carboxyl group at one terminus and having a pendant hydroxy group on a molecular chain was thus prepared. The vinyl-based monomer and the solvent used above were all subjected to a dehydration treatment using molecular sieves.

(2) 0.45 parts by mass of tetrabutylammonium bromide, 0.04 parts by mass of hydroquinone monomethyl ether, and 2.21 parts by mass of glycidyl methacrylate were added to the solution of the polymer (entire amount) obtained in (1) above, a reaction was carried out at 110° C. for 7 hours, and a solution containing a macromonomer having a methacrylate group at one terminus and having a hydroxy group on a molecular chain was prepared.

(3) 6.0 parts by mass of succinic acid anhydride was added at 110° C. to the solution containing the macromonomer having a methacrylate group at one terminus obtained in (2) above (entire amount), and the succinic acid was reacted

TABLE 2

| Production Example (PE) No. | PE 1 | PE 2 | PE 3 | PE 4 | PE 5 | PE 6 | PE 7 |
|---|---|---|---|---|---|---|---|
| Macromonomer code | M-1 | M-2 | M-3 | M-4 | M-5 | M-6 | M-7 |
| [Monomer liquid composition (parts by mass)] | | | | | | | |
| Vinyl-based monomer | | | | | | | |
| Lauryl methacrylate | 75.0 | 65.0 | | | | | |
| Lauryl acrylate | | | 90.0 | 75.0 | 65.0 | | |
| Stearyl methacrylate | | | | | | 75.0 | 75.0 |
| Acrylic acid | 25.0 | 35.0 | 10.0 | 25.0 | 35.0 | 25.0 | 25.0 |
| Solvent | | | | | | | |
| Methyl ethyl ketone | 10.0 | 10.0 | 10.0 | 10.0 | 10.0 | | |
| n-Heptane | | | | | | 20.0 | 20.0 |
| Polymerization catalyst[1)] | | | | | | | |
| DPBP | 0.3 | 0.3 | 0.3 | 0.3 | 0.3 | | |
| DTHP | | | | | | 0.2 | 0.2 |
| [Polymerization temp (° C.)] | 235 | 235 | 235 | 235 | 235 | 230 | 200 |
| [Macromonomer] | | | | | | | |
| Molecular weight | | | | | | | |
| Weight-average molecular weight | 3800 | 4200 | 5400 | 5500 | 6100 | 5700 | 14100 |
| Number-average molecular weight | 1800 | 2000 | 2500 | 2400 | 2500 | 3100 | 5200 |
| Percentage introduction of terminal ethylenically unsaturated group (%) | 97 | 95 | 95 | 92 | 93 | 102 | 99 |

[1)]Polymerization catalyst:
DPBP: di-tert-butyl peroxide
DHTP: di-tert-hexyl peroxide

PRODUCTION EXAMPLE 8

Production of Macromonomer (M-8)

(1) A glass reactor equipped with a stirrer, a reflux condenser, two dropping funnels, a nitrogen inlet, and a thermometer was charged with 42.0 parts by mass of a hydrocarbon-based solvent ('Isopar L' manufactured by Isopar Exxon) and 20.0 parts by mass of toluene, and the reactor internal temperature was increased to 90° C. by heating with a with the hydroxy group in the macromonomer. Immediately after adding the succinic acid anhydride, particles of succinic acid anhydride were floating in the reaction liquid, but insolubles disappeared as the reaction progressed, heating was continued at 110° C. for 2 hours after the insolubles disappeared, and cooling was carried out, thus giving a solution containing a macromonomer having a methacrylate group at one terminus and a carboxyl group in a molecular chain (macromonomer) [hereinafter, this is called 'macromonomer (M-8)'].

(4) (i) When the solution containing macromonomer (M-8) obtained in (3) above was heated at 200° C. for 30 minutes, the residue (solids content) was 58.9 mass %.
(ii) Furthermore, with regard to macromonomer (M-8), when the acid value was measured by a titration method using a 0.1 N ethanol solution of potassium hydroxide, it was 32.6 mg KOH/g of solids.
(iii) Moreover, when the molecular weight of macromonomer (M-8) and the percentage introduction of terminal ethylenically unsaturated group were measured by the above-mentioned methods, the weight-average molecular weight (Mw) was 17800, the number-average molecular weight (Mn) was 8100, and the percentage introduction of terminal ethylenically unsaturated group was 83%.

PRODUCTION EXAMPLE 9

Production of Non-Macromonomer Polymer (N-1)

(1) A reactor equipped with a stirrer, a reflux condenser, a thermometer, and a nitrogen inlet was charged with 65.0 parts by mass of methyl ethyl ketone, and heated at a reactor internal temperature of 78° C. under a flow of nitrogen by means of a water bath.
(2) Meanwhile, 85.0 parts by mass of lauryl acrylate, 15.0 parts by mass of acrylic acid, 2.5 parts by mass of azobis 2-methylbutyronitrile, and 22.5 parts by mass of methyl ethyl ketone were mixed to give a vinyl-based monomer mixed liquid. Furthermore, separately therefrom, 17.0 parts by mass of methyl ethyl ketone and 4.2 parts by mass of mercaptopropionic acid were mixed to give a chain transfer agent liquid.
(3) After the reactor internal temperature became stable at 78° C., 5.0 parts by mass of the vinyl-based monomer mixed liquid prepared in (2) above was added to the reactor, and 5 minutes thereafter dropwise addition of 120 parts by mass of the remaining vinyl-based monomer mixed liquid and 21.2 parts by mass of the chain transfer agent liquid was started. Dropwise addition was carried out at a constant rate over 3 hours using a metering pump, and during this time the reactor internal temperature was maintained at 78° C. After dropwise addition was complete, the reactor internal temperature was increased to 80° C., maintained at 80° C. for 3 hours, and then cooled, thus giving a solution containing a polymer, which was not a macromonomer [hereinafter, called 'non-macromonomer polymer (N-1)'].
(4) The residue (solids content) when the solution containing non-macromonomer polymer (N-1) obtained in (3) above was heated at 150° C. for 1 hour was 50.3 mass %.
(ii) When the molecular weight of non-macromonomer polymer (N-1) and the percentage introduction of terminal ethylenically unsaturated group were measured by the methods above, the weight-average molecular weight (Mw) was 4400, the number-average molecular weight (Mn) was 2900, and the percentage introduction of terminal ethylenically unsaturated group was 0%.

PRODUCTION EXAMPLES 10 and 11

Production of Non-Macromonomer Polymers (N-2) and (N-3)

(1) The same procedures as in (1) to (3) of Production Example 9 were carried out except that the mixture composition of the vinyl-based monomer mixed liquid was changed as described in Table 3 below, and solutions containing a polymer, which was not a macromonomer, were prepared [the polymers obtained thereby were called non-macromonomer polymers (N-2) and (N-3)].
(2) With regard to the non-macromonomer polymers (N-2) and (N-3) obtained in (1) above, the solids content, the weight-average molecular weight (Mw), the number-average molecular weight (Mn), and the percentage introduction of terminal ethylenically unsaturated group were determined by the methods above and found to be as shown in Table 3 below.

TABLE 3

| | Production Example No. | | |
|---|---|---|---|
| | Production Example 9 | Production Example 10 | Production Example 11 |
| Non-macromonomer polymer code | N-1 | N-2 | N-3 |
| [Monomer liquid composition (parts by mass)] | | | |
| Vinyl-based monomer | | | |
| Lauryl acrylate | 85.0 | 75.0 | 65.0 |
| Acrylic acid | 15.0 | 25.0 | 35.0 |
| Solvent | | | |
| Methyl ethyl ketone | 22.5 | 22.5 | 22.5 |
| Polymerization catalyst | | | |
| Azobis 2-methylbutyronitrile | 2.5 | 2.5 | 2.5 |
| [Polymerization temp (° C.)] | 78 | 78 | 78 |
| [Macromonomer] | | | |
| Molecular weight | | | |
| Weight-average molecular weight | 4400 | 5200 | 5200 |
| Number-average molecular weight | 2900 | 3400 | 3400 |
| Percentage introduction of terminal ethylenically unsaturated group (%) | 0 | 0 | 0 |

EXAMPLE 1

Production of Polymer Microparticles (PA-1)

(1) Macromonomer (M-1) obtained in Production Example 1 was dissolved in n-heptane at 40° C., thus giving a solution containing macromonomer (M-1) at a solids content concentration [macromonomer (M-1)] of 30.0±0.5 mass % (dispersion stabilizer liquid). The solids content referred to here was a value calculated from the mass of the residue when the solution containing the macromonomer was heated at 150° C. for 1 hour.
(2) A polymerization reactor equipped with a stirring mechanism consisting of a pitched paddle stirring blade and two vertical baffles and further equipped with a thermometer, a reflux condenser, and a nitrogen inlet was charged with 33.33 parts by mass of the solution of macromonomer (M-1) prepared in (1) above [10.0 parts by mass as macromonomer (M-1)] and 333.67 parts by mass of n-heptane (total amount of n-heptane in polymerization reactor 357.0 parts by mass).
(3) Meanwhile, another reactor was charged with 30.0 parts by mass of acrylic acid, 70.0 parts by mass of 2-acrylamido-2-methylpropanesulfonic acid, 9.80 parts by mass (corresponding to 4.0 mol relative to 100 mol of monofunctional vinyl-based monomer) of polyethylene glycol diacrylate ('Aronix M-240' manufactured by Toagosei Co., Ltd., average molecular weight 324), and 83.5 parts by mass of ion-exchanged water, and after they were dissolved uniformly by stirring at 30° C. or below, this liquid was neutralized by slowly adding 38.5 parts by mass of 25% aqueous ammonia while maintaining the temperature at 40° C. or below, thus giving a vinyl-based monomer mixed liquid (aqueous solution).

(4) After adjusting the rotational speed of the stirring blade provided within the polymerization reactor, the polymerization reactor was charged with the vinyl-based monomer mixed liquid (entire amount) obtained in (3) above, and stirring and mixing were carried out while maintaining the temperature within the polymerization reactor at 20° C., thus giving a w/o type dispersion in which the vinyl-based monomer mixed liquid (aqueous solution) was dispersed in an oil phase (n-heptane phase) as droplets. Furthermore, during these mixing and stirring operations, nitrogen gas was blown into the polymerization reactor to thus remove oxygen within the polymerization reactor.

(5) At the point at which 1 hour and 40 minutes had elapsed after the vinyl-based monomer mixed liquid was added, a solution in which 0.083 parts by mass of an 80 mass % solution of cumene hydroperoxide (oxidizing agent) ('Percumyl H80' manufactured by NOF Corporation, aromatic hydrocarbon-diluted product) was diluted with 1.25 parts by mass of n-heptane was added to the polymerization reactor, at the point at which 2 hours had elapsed after the vinyl-based monomer mixed liquid was added, the polymerization reactor was externally heated, and at the point at which the polymerization reactor internal temperature had reached 25° C., a solution in which 0.15 parts by mass of sodium hydrosulfite (reducing agent) was dissolved in 3.4 parts by mass of ion-exchanged water was added. After the addition, the polymerization reactor internal temperature immediately increased, and it was confirmed that polymerization was initiated. The polymerization reactor internal temperature reached a peak temperature (41° C.) in a few minutes. Immediately after it reached the peak temperature, a solution in which 0.018 parts by mass of a 69 mass % solution of t-butyl hydroperoxide (oxidizing agent) ('Perbutyl H69' manufactured by NOF. Corporation, water-diluted product) was diluted with 2.0 parts by mass of ion-exchanged water was added. The polymerization reactor internal temperature immediately rose to 46° C., and then decreased. The reaction liquid within the polymerization reactor was cooled to room temperature, thus giving a dispersion of polymer microparticles (PA-1).

Figure 2:
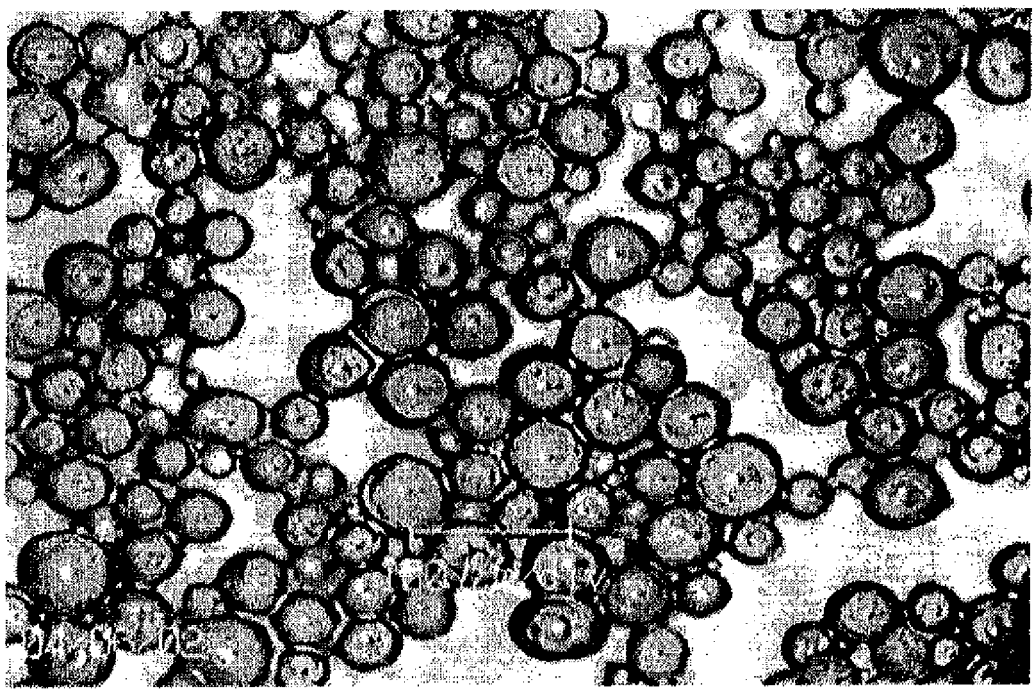
FIG. 2 is a photograph taken by a digital microscope of a dispersion of polymer microparticles obtained in Example 1.

(6) (i) A portion of the dispersion of polymer microparticles (PA-1) obtained in (5) above was sampled, and photographed at a magnification of 450 times using a digital microscope ('VH-6000' manufactured by Keyence Corporation) as in the photograph of FIG. 2. As seen in the photograph of FIG. 2, the polymer microparticles (PA-1) obtained in (5) above were formed from a group of spherical polymer microparticles having a particle size distribution centered on around 40 μm, and aggregated particles (secondary particles) in which a plurality of polymer microparticles were fused were not observed.

(ii) Furthermore, when the dispersion of polymer microparticles (PA-1) was taken out from the polymerization reactor, adhesion of the polymer microparticles to the interior of the polymerization reactor was visually examined; only a few polymer microparticles adhered to the vicinity of the liquid level within the polymerization reactor, and there was no adhesion to the walls of the polymerization reactor.

(iii) A portion of the dispersion of polymer microparticles (PA-1) obtained in (5) above was sampled, and the amount of residue remaining on a polyethylene filter cloth (200 mesh; mesh opening 114 μm) was measured by the above-mentioned method, and it was a low value of 0.028 mass % (278 ppm).

(iv) A portion of the dispersion of polymer microparticles (PA-1) obtained in (5) above was sampled, the dispersion was heated at 110° C. for 1 hour, and dried polymer microparticles (PA-1) were thus collected and stored in a sealed glass bottle. When the average particle size (when dried) and the water absorption ratio thereof were measured by the above-mentioned methods, the average particle size was 42.4 μm, and the water absorption ratio was 16.8 times.

Figure 3:
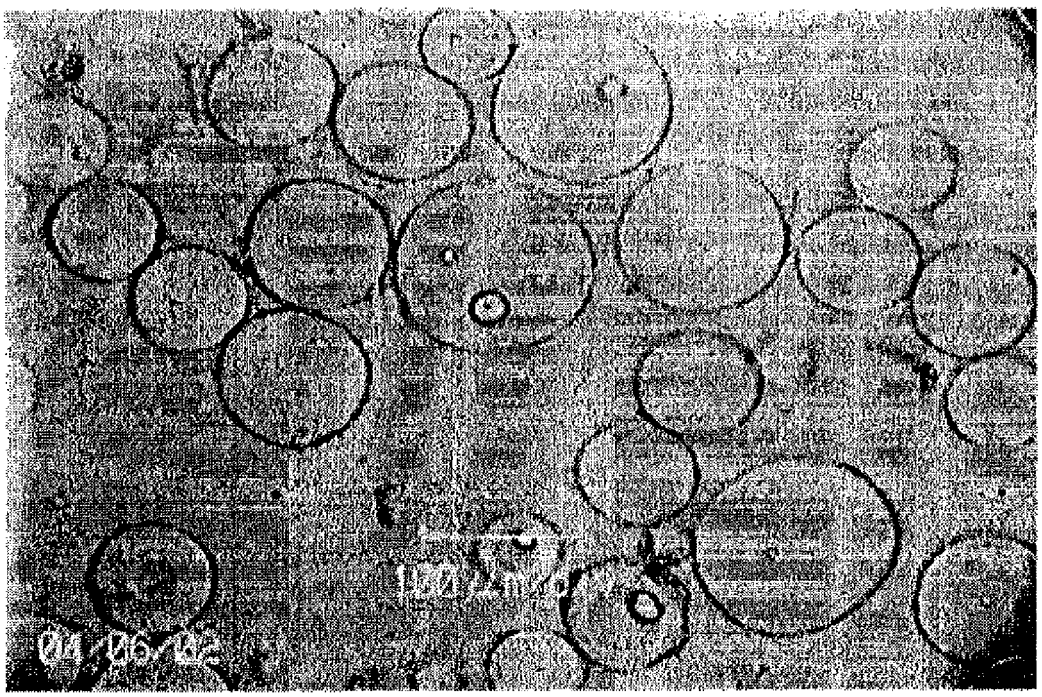
FIG. 3 is a photograph taken by a digital microscope of the polymer microparticles obtained in Example 1 in saturated water-swollen state.

(7) (i) Furthermore, a portion of the dispersion obtained in (5) above was sampled, the dispersion was heated at 110° C. for 1 hour, dried polymer microparticles (PA-1) were thus collected, they were charged into a large excess of ion-exchanged water and allowed to stand at 25° C. for 1 hour to thus make them swell until in a saturated state, and the state was photographed at a magnification of 450 times using a digital microscope ('VH-6000' manufactured by Keyence Corporation) as in the photograph of FIG. 3. As seen in the photograph of FIG. 3, saturated water-swollen particles of polymer microparticles (PA-1) obtained in (5) above had a particle size distribution centered on around 100 μm.

(ii) The average particle size of polymer microparticles (PA-1) collected in (i) above in a saturated water-swollen state was examined by the above-mentioned method, and it was 95.2 μm.

EXAMPLES 2 to 8

Production of Polymer Microparticles (PA-2) to (PA-8)

(1) The same procedures as in (1) to (5) of Example 1 were carried out except that instead of macromonomer (M-1) one of the macromonomers (M-2) to (M-5) was used as a dispersion stabilizer in an amount shown in Table 4 below (Examples 2 to 5), or macromonomer (M-5) or (M-1) and another dispersion stabilizer (sorbitan monooleate, 'RHEODOL AO-10' manufactured by Kao Corporation, emulsifier for w/o type emulsion, HLB=4.3) were used in amounts shown in Table 4 below (Examples 7 and 8), and dispersions of polymer microparticles (PA-2) to (PA-8) were thus produced.

(2) When the dispersions of polymer microparticles (PA-2) to (PA-8) obtained in (1) above were taken out of the polymerization reactor, adhesion of the polymer microparticles to the interior of the polymerization reactor was visually examined; only a few, or a thin band, of polymer microparticles adhered to the vicinity of the liquid level within the polymerization reactor, and there was no adhesion to the walls of the polymerization reactor.

(3) With regard to the dispersions of polymer microparticles (PA-2) to (PA-8) obtained in (1) above, the amount of residue on a polyethylene filter cloth (200 mesh; mesh opening 114 μm), the average particle size (when dried) of polymer microparticles (PA-2) to (PA-8), the water absorption ratio, and the average particle size in a saturated water-swollen state were determined by the above-mentioned methods as described in Example 1, and they were as shown in Table 4 below.

COMPARATIVE EXAMPLES 1 to 8

Production of Polymer Microparticles (PB-1) to (PB-8)

(1) The same procedures as in (1) to (5) of Example 1 were carried out except that instead of macromonomer (M-1)

one of the non-macromonomer polymers (N-1) to (N-3) obtained in Production Examples 9 to 11 was used as a dispersion stabilizer in an amount shown in Table 5 below (Comparative Examples 1 to 3), or non-macromonomer polymer (N-3) and another dispersion stabilizer (sorbitan monooleate, 'RHEODOL AO-10' manufactured by Kao Corporation, emulsifier for w/o type emulsion, HLB=4.3) in amounts shown in Table 5 below (Comparative Examples 5 and 7), or two types of other dispersion stabilizers [triblock copolymer type dispersion stabilizer ('HY-PERMER B-246' manufactured by Unidema, polymer emulsification dispersing agent for w/o emulsion) and sorbitan monooleate ('RHEODOL AO-10' manufactured by Kao Corporation, emulsifier for w/o type emulsion, HLB=4.3)] were used in amounts shown in Table 5 below (Comparative Examples 46 and 8), and dispersions of polymer microparticles (PB-1) to (PB-8) were thus produced.

(2) It was found that, in Comparative Examples 1 to 4, large aggregated lumps were formed at the same time as polymerization started, and dispersions of polymer microparticles could not be obtained.

(3) (i) In Comparative Examples 5 to 8, dispersions of polymer microparticles (PB-5) to (PB-8) could be produced, but when an in-oil dispersion immediately after polymerization and a dispersion in a saturated water-swollen state obtained by separating and collecting polymer microparticles from a dispersion, drying them, and then charging them into water were examined using a microscope in the same manner as in Example 1, a large number of aggregated particles in which the particles themselves had aggregated were formed, and in both the in-oil dispersion and the dispersion in a saturated water-swollen state, aggregates that could not be redispersed into individual primary particles were formed.

(ii) With regard to Comparative Examples 5 to 8, the state of adhesion within the polymerization reactor, the amount of residue on a polyethylene filter cloth (200 mesh; mesh opening 114 μm) from the dispersions of polymer microparticles (PB-5) to (PB-8), the average particle size (when dried) of polymer microparticles (PB-5) to (PB-8), the water absorption ratio, and the average particle size in a saturated water-swollen state were determined by the above-mentioned methods as described in Example 1, and they were as shown in Table 5 below.

TABLE 4

| | Example | | | | | | | |
|---|---|---|---|---|---|---|---|---|
| | 1 | 2 | 3 | 4 | 5 | 6 | 7 | 8 |
| Polymer microparticle code [Monomer composition (parts by mass)] | PA-1 | PA-2 | PA-3 | PA-4 | PA-5 | PA-6 | PA-7 | PA-8 |
| Acrylic acid | 30.0 | 30.0 | 30.0 | 30.0 | 30.0 | 30.0 | 30.0 | 30.0 |
| 2-Acrylamido-2-methylpropane-sulfonic acid | 70.0 | 70.0 | 70.0 | 70.0 | 70.0 | 70.0 | 70.0 | 70.0 |
| Polyethylene glycol diacrylate [Dispersion stabilizer] | 9.80 | 9.80 | 9.80 | 9.80 | 9.80 | 9.80 | 9.80 | 9.80 |
| Dispersion stabilizer (1) Type (type of macromonomer) | M-1 | M-2 | M-3 | M-4 | M-5 | M-5 | M-5 | M-1 |
| Amount used (parts by mass) | 10.0 | 10.0 | 10.0 | 10.0 | 10.0 | 8.0 | 1.2 | 1.2 |
| Dispersion stabilizer (2) Type[1)] | | | | | | AO-10 | AO-10 | AO-10 |
| Amount used (parts by mass) [Polymer microparticles] | | | | | | 2.0 | 8.0 | 8.0 |
| Extent of adhesion of polymer microparticles[2)] | A | B | B | A | B | B | A | A |
| Amount of residue on polyethylene filter cloth (mass %) | 0.028 | 0.020 | —[3)] | 0.102 | 0.006 | 0.151 | 0.324 | 0.019 |
| Average particle size (μm) | 42.4 | 33.1 | 59.1 | 36.3 | 34.4 | 29.3 | 21.2 | 19.4 |
| Water absorption ratio (times) | 16.8 | 17.1 | 16.2 | 16.7 | 16.9 | 16.8 | 17.5 | 17.9 |
| Average particle size in saturated water-swollen state (μm) | 95.2 | 68.4 | 142.0 | 77.0 | 72.6 | 62.9 | 42.2 | 42.5 |

[1)]Dispersion stabilizer:
AO-10: sorbitan monooleate ('RHEODOL AO-10' manufactured by Kao Corporation)
[2)]Extent of polymer microparticles adhering to polymerization reactor
[3)]Majority of particles remained on polyethylene filter cloth due to large primary particles

TABLE 5

| | Comparative Example | | | | | | | |
|---|---|---|---|---|---|---|---|---|
| | 1 | 2 | 3 | 4 | 5 | 6 | 7 | 8 |
| Polymer microparticle code [Monomer composition (parts by mass)] | PB-1 | PB-2 | PB-3 | PB-4 | PB-5 | PB-6 | PB-7 | PB-8 |
| Acrylic acid | 30.0 | 30.0 | 30.0 | 30.0 | 30.0 | 30.0 | 30.0 | 30.0 |
| 2-Acrylamido-2-methylpropane sulfonic acid | 70.0 | 70.0 | 70.0 | 70.0 | 70.0 | 70.0 | 70.0 | 70.0 |
| Polyethylene glycol diacrylate | 9.80 | 9.80 | 9.80 | 9.80 | 9.80 | 9.80 | 9.80 | 9.80 |

TABLE 5-continued

| | Comparative Example | | | | | | | |
|---|---|---|---|---|---|---|---|---|
| | 1 | 2 | 3 | 4 | 5 | 6 | 7 | 8 |
| [Dispersion stabilizer] | | | | | | | | |
| Dispersion stabilizer (1) Type[1] | N-1 | N-2 | N-3 | B-246 | N-3 | B-246 | N-3 | B-246 |
| Amount used (parts by mass) | 10.0 | 10.0 | 10.0 | 10.0 | 8.00 | 8.0 | 1.2 | 1.2 |
| Dispersion stabilizer (2) Type[1] | | | | | AO-10 | AO-10 | AO-10 | AO-10 |
| Amount used (parts by mass) | | | | | 2.0 | 2.0 | 8.0 | 8.0 |
| [Polymer microparticles] | | | | | | | | |
| Extent of adhesion of polymer microparticles[2] | —[3] | —[3] | —[3] | —[3] | D | C | C | C |
| Amount of residue on polyethylene filter cloth (mass %) | —[3] | —[3] | —[3] | —[3] | —[4] | —[4] | —[4] | —[4] |
| Average particle size (μm) | —[3] | —[3] | —[3] | —[3] | 34.5 | 29.5 | 18.0 | 18.9 |
| Water absorption ratio (times) | —[3] | —[3] | —[3] | —[3] | 17.8 | 16.1 | 16.9 | 15.5 |
| Average particle size in saturated water-swollen state (μm) | —[3] | —[3] | —[3] | —[3] | 72.6 | 62.9 | 42.2 | 42.5 |

[1]Dispersion stabilizer:
N-1: non-macromonomer polymer produced in Production Example 9
N-2: non-macromonomer polymer produced in Production Example 10
N-3: non-macromonomer polymer produced in Production Example 11
B-246: triblock copolymer type (HYPERMER B-246' manufactured by Uniqema)
AO-10: sorbitan monooleate ('RHEODOL AO-10' manufactured by Kao Corporation)
[2]Extent of polymer microparticles adhering to polymerization reactor
[3]Large aggregates formed at the same time as polymerization started, dispersion of polymer microparticles could not be obtained.
[4]Many aggregated particles, polyethylene filter cloth blocked, filtration could not carried out.

As seen in the results of Examples 1 to 8 in Table 4 above, in Examples 1 to 8 in which hydrophilic (water-swelling) polymer microparticles were produced by inverse phase suspension polymerization using a macromonomer having a radically polymerizable unsaturated group at a terminus of a vinyl-based monomer-derived polymer [specifically, macromonomers (M-1) to (M-5] as a dispersion stabilizer, polymer microparticles having an appropriate particle size of on the order of a few μm to a few tens of μm with uniform particle size, having excellent water absorbability, and being capable of dispersing well as individual primary particles without forming secondary particles due to aggregation of the particles themselves in water while maintaining a spherical shape when swollen by water absorption could be obtained.

In contrast thereto, as seen in the results of Comparative Examples 1 to 8 of Table 5 above, in Comparative Examples 1 to 8 in which, when carrying out inverse phase suspension polymerization of a hydrophilic vinyl-based monomer, a macromonomer having a radically polymerizable unsaturated group at a terminus of a vinyl-based monomer-derived polymer was not used as a dispersion stabilizer, aggregation occurred immediately after polymerization started, and inverse phase suspension polymerization could not be carried out in practice (Comparative Examples 1 to 4), or although it was possible to produce polymer microparticles by inverse phase suspension polymerization, a large number of very large aggregated particles were formed, and primary particles free of aggregation and having a predetermined appropriate and uniform particle size could not be obtained (Comparative Examples 5 to 8).

EXAMPLE 9

Production of Polymer Microparticles (PA-9)

(1) Macromonomer (M-1) obtained in Production Example 1 was dissolved in n-heptane at 40° C., thus giving a solution containing macromonomer (M-1) at a solids content concentration [macromonomer (M-1)] of 30.0±0.5 mass % (dispersion stabilizer liquid). The solids content referred to here was a value calculated from the mass of the residue when the solution containing the macromonomer was heated at 150° C. for 1 hour.

(2) A polymerization reactor equipped with a stirring mechanism consisting of a pitched paddle stirring blade and two vertical baffles and further equipped with a thermometer, a reflux condenser, and a nitrogen inlet was charged with 2.33 parts by mass of the solution of macromonomer (M-1) prepared in (1) above [0.70 parts by mass as macromonomer (M-1)], 1.50 parts by mass of sorbitan monooleate ('RHEODOL AO-10' manufactured by Kao Corporation, emulsifier for w/o type emulsion, HLB=4.3), and 162.9 parts by mass of n-heptane (polymerization solvent) (total amount of n-heptane in polymerization reactor 164.5 parts by mass).

(3) Meanwhile, another reactor was charged with 100.0 parts by mass of acrylic acid, 7.83 parts by mass (corresponding to 1.74 mol relative to 100 mol of acrylic acid) of polyethylene glycol diacrylate ('Aronix M-240' manufactured by Toagosei Co., Ltd., average molecular weight 324), and 88.0 parts by mass of ion-exchanged water, and after they were dissolved uniformly by stirring at 30° C. or below, this liquid was neutralized by slowly adding 70.8 parts by mass of 25% aqueous ammonia while maintaining the temperature at 40° C. or below, thus giving a vinyl-based monomer mixed liquid (aqueous solution).

(4) After adjusting the rotational speed of the stirring blade provided within the polymerization reactor, the polymerization reactor was charged with 30 mass % of the (total amount) of the vinyl-based monomer mixed liquid obtained in (3) above, and then with a solution in which 0.098 parts by mass of ammonium persulfate was dissolved in 1.18 parts by mass of ion-exchanged water, thus giving a w/o type dispersion in which the vinyl-based monomer mixed liquid (aqueous solution) was dispersed in an oil phase (n-heptane) as droplets. In this process, stirring and mixing were carried out while maintaining the temperature within the polymerization reactor at 20° C., and nitrogen gas was blown into the polymerization reactor to thus remove oxygen within the polymerization reactor.

(5) At the point at which 2 hours had elapsed after 30 mass % of the vinyl-based monomer mixed liquid was added as above, a first stage polymerization was started by adding 1.74 parts by mass of a reducing agent aqueous solution (solution of 0.074 parts by mass of sodium hydrosulfite dissolved in 1.67 parts by mass of ion-exchanged water in which ferrous sulfate was dissolved at a concentration of 800 ppm). After addition of the reducing agent aqueous solution, the polymerization reactor internal temperature immediately increased, and it was confirmed that polymerization was initiated. The polymerization reactor internal temperature reached a peak temperature (39° C.) in a few minutes. Immediately after it reached the peak temperature, 1.27 parts by mass of a 386 ppm aqueous solution of t-butyl hydroperoxide (oxidizing agent) was added. The polymerization reactor internal temperature immediately rose to 41° C., and then decreased.

(6) After the reaction liquid within the polymerization reactor was cooled to 23° C. or below, the polymerization reactor was charged with the remaining vinyl-based monomer mixed liquid (70 mass % of the total amount), and then with a solution of 0.142 parts by mass of ammonium persulfate in 1.69 parts by mass of ion-exchanged water. After confirming that the polymerization reactor internal temperature was 20° C., a second stage polymerization was started by adding 2.51 parts by mass of a reducing agent aqueous solution (a solution of 0.106 parts by mass of sodium hydrosulfite dissolved in 2.40 parts by mass of ion-exchanged water in which ferrous sulfate was dissolved at a concentration of 800 ppm). After the addition of the reducing agent aqueous solution, the polymerization reactor internal temperature immediately increased, and it was confirmed that polymerization was initiated. The polymerization reactor internal temperature reached a peak temperature (37° C.) in a few minutes. Immediately after it reached the peak temperature, 1.75 parts by mass of a 0.876 mass % aqueous solution of t-butyl hydroperoxide (oxidizing agent) was added. The polymerization reactor internal temperature immediately rose to 50° C., and then decreased. The reaction liquid within the polymerization reactor was cooled to room temperature, thus giving a dispersion of polymer microparticles (PA-9).

(7) (i) A portion of the dispersion of polymer microparticles (PA-9) obtained in (6) above was sampled and examined at a magnification of 450 times using a digital microscope (VH-6000' manufactured by Keyence Corporation); it was formed from a group of spherical polymer microparticles having a particle size distribution centered on around 20 μm, and aggregated particles (secondary particles) in which a plurality of polymer microparticles were fused were not observed.

(ii) Furthermore, when the dispersion of polymer microparticles (PA-9) was taken out from the polymerization reactor, adhesion of the polymer microparticles to the interior of the polymerization reactor was visually examined; only a few polymer microparticles adhered to the vicinity of the liquid level within the polymerization reactor, and there was no adhesion to the walls of the polymerization reactor.

(iii) A portion of the dispersion of polymer microparticles (PA-9) obtained in (6) above was sampled, and the amount of residue remaining on a polyethylene filter cloth (200 mesh; mesh opening 114 μm) was measured by the above-mentioned method, and it was a low value of 1.7 mass %.

(8) (i) A portion of the dispersion of polymer microparticles (PA-9) obtained in (6) above was sampled, the dispersion was heated at 110° C. for 1 hour, and dried polymer microparticles (PA-9) were thus collected and stored in a sealed glass bottle. When the average particle size (when dried) and the water absorption ratio thereof were measured by the above-mentioned methods in the same manner as in Example 1, the average particle size was 22.0 μm, and the water absorption ratio was 22.0 times.

(ii) Furthermore, a portion of the dispersion obtained in (6) above was sampled, the dispersion was heated at 110° C. for 1 hour, dried polymer microparticles (PA-1) were thus collected, they were then charged into a large excess of ion-exchanged water and allowed to stand at 25° C. for 1 hour to thus make them swell until in a saturated state, and when the state was examined at a magnification of 450 times using a digital microscope ('VH-6000' manufactured by Keyence Corporation), it was formed from spherical primary particles in a saturated water-swollen state, and the average particle size in the saturated water-swollen state was 45.5 μm.

(9) It was found from the results of Example 9 that when hydrophilic (water-swelling) polymer microparticles were produced by inverse phase suspension polymerization using a macromonomer having a radically polymerizable unsaturated group at a terminus of a vinyl-based monomer-derived polymer [specifically macromonomer (M-1)] as a dispersion stabilizer, even when polymerization was carried out in two stages, polymer microparticles having an appropriate particle size of on the order of a few μm to a few tens of μm with uniform particle size, having excellent water absorbability, and being capable of dispersing well as individual primary particles without forming secondary particles due to aggregation of the particles themselves in water while maintaining a spherical shape when swollen by water absorption could be obtained.

COMPARATIVE EXAMPLE 9

Production of Polymer Microparticles PB-9

When a dispersion of polymer microparticles (PB-9) was produced by the same procedures as in (1) to (6) of Example 9 except that 2.20 parts by mass of sorbitan monooleate ('RHEODOL AO-10' manufactured by Kao Corporation, emulsifier for w/o type emulsion, HLB=4.3) alone was used as a dispersion stabilizer, and 164.5 parts by mass of n-heptane was charged as a polymerization solvent, very large aggregated lumps were formed at the same time as the second stage polymerization started, and a dispersion of polymer microparticles could not be produced.

EXAMPLE 10

Production of Polymer Microparticles (PA-10)

(1) Macromonomer (M-1) obtained in Production Example 1 was dissolved in n-heptane at 40° C., thus giving a solution containing macromonomer (M-1) at a solids content concentration [macromonomer (M-1)] of 30.0±0.5 mass % (dispersion stabilizer liquid). The solids content referred to here was a value calculated from the mass of the residue when the solution containing the macromonomer was heated at 150° C. for 1 hour.

(2) A polymerization reactor equipped with a stirring mechanism consisting of a pitched paddle stirring blade and two vertical baffles and further equipped with a thermometer, a reflux condenser, and a nitrogen inlet was charged with 16.7 parts by mass of the solution of macromonomer (M-1)

prepared in (1) above [5.0 parts by mass as macromonomer (M-1)] and 388.3 parts by mass of n-heptane (total amount of n-heptane in the polymerization reactor 400.0 parts by mass).

(3) Meanwhile, another reactor was charged with 100.0 parts by mass of acrylic acid, 14.8 parts by mass (corresponding to 2.5 mol relative to 100 mol of monofunctional vinyl-based monomer) of polyethylene glycol diacrylate ('Aronix M-243' manufactured by Toagosei Co., Ltd., average molecular weight 425), and 95.0 parts by mass of ion-exchanged water, and after they were dissolved uniformly by stirring at 30° C. or below, this liquid was neutralized by slowly adding 70.8 parts by mass of 25% aqueous ammonia while maintaining the temperature at 40° C. or below, thus giving a vinyl-based monomer mixed liquid (aqueous solution).

(4) After adjusting the rotational speed of the stirring blade provided within the polymerization reactor, the polymerization reactor was charged with the vinyl-based monomer mixed liquid (entire amount) obtained in (3) above, and stirring and mixing were carried out while maintaining the temperature within the polymerization reactor at 20° C., thus giving a w/o type dispersion in which the vinyl-based monomer mixed liquid (aqueous solution) was dispersed in an oil phase (n-heptane phase) as droplets. Furthermore, during these mixing and stirring operations, nitrogen gas was blown into the polymerization reactor to thus remove oxygen within the polymerization reactor.

(5) At the point at which 1 hour and 50 minutes had elapsed after the vinyl-based monomer mixed liquid was added, 3.11 parts by mass of a 0.60 mass % aqueous solution of t-butyl hydroperoxide (oxidizing agent, abbreviated to TBHP) ('Perbutyl H' manufactured by NOF Corporation, 69% aqueous solution of TBHP diluted with water such that the concentration of TBHP became 0.60 mass %) was charged into the polymerization reactor. At the point at which 2 hours had elapsed after the vinyl-based monomer mixed liquid was added, a solution in which 0.18 parts by mass of sodium hydrosulfite (reducing agent) was dissolved in 2.87 parts by mass of ion-exchanged water was added. After the addition, the polymerization reactor internal temperature immediately increased, and it was confirmed that polymerization was initiated. The polymerization reactor internal temperature reached a peak temperature (54° C.) within one minute. Immediately after it reached the peak temperature, 3.19 parts by mass of a 0.23 mass % aqueous solution of t-butyl hydroperoxide (oxidizing agent) was added. The polymerization reactor internal temperature immediately rose to 64° C., and then decreased. The reaction liquid within the polymerization reactor was cooled to room temperature, thus giving a dispersion (in-oil type dispersion) of polymer microparticles (PA-10).

Figure 4:
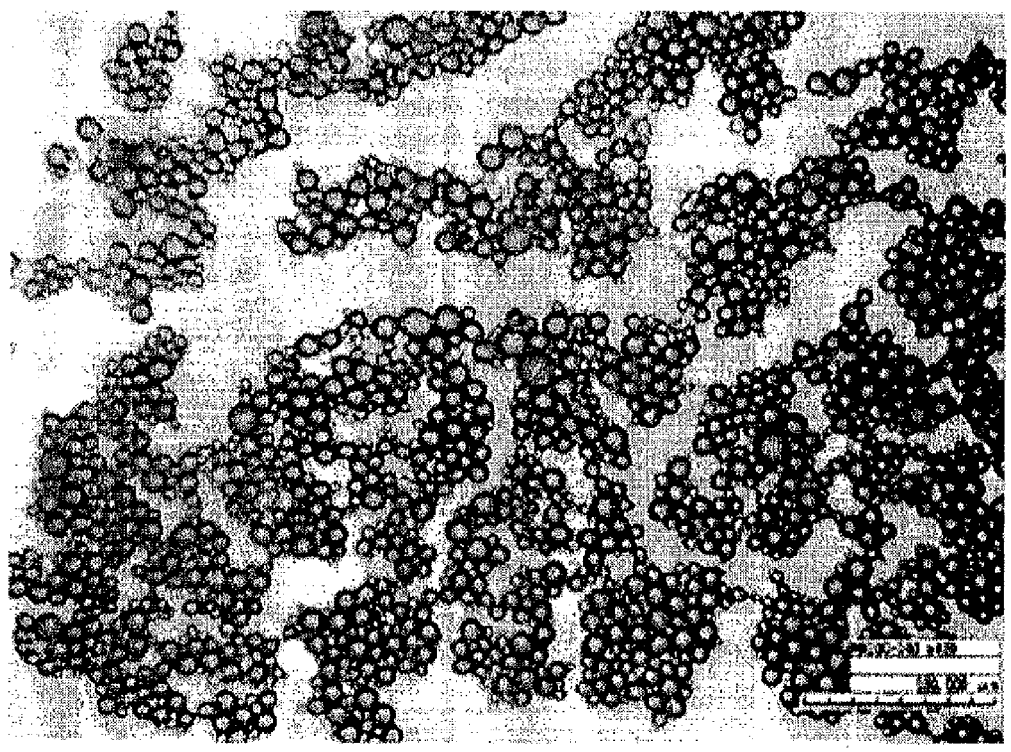
FIG. 4 is a photograph taken by a digital microscope of a dispersion of polymer microparticles obtained in Example 10.

(6) (i) A portion of the dispersion of polymer microparticles (PA-10) obtained in (5) above was sampled, and photographed at a magnification of 420 times using a digital microscope ('KH-3000' manufactured by HIROX Co., Ltd.) as in the photograph of FIG. 4. As seen in the photograph of FIG. 4, polymer microparticles (PA-10) obtained in (5) above were formed from a group of spherical polymer microparticles having a particle size distribution centered on around 20 μm, and aggregated particles (secondary particles) in which a plurality of polymer microparticles were fused were not observed.

(ii) Furthermore, when the dispersion of polymer microparticles (PA-10) was taken out from the polymerization reactor, adhesion of the polymer microparticles to the interior of the polymerization reactor was visually examined; only a few polymer microparticles adhered to the vicinity of the liquid level within the polymerization reactor, and there was no adhesion to the walls of the polymerization reactor.

(iii) A portion of the dispersion of polymer microparticles (PA-10) obtained in (5) above was sampled, and the amount of residue remaining on a polyethylene filter cloth (200 mesh; mesh opening 114 μm) was measured by the above-mentioned method, and it was a low value of 0.067 mass % (670 ppm).

(7) The remainder of the dispersion of polymer microparticles (PA-10) obtained in (5) above was placed in a glass vessel equipped with an anchor type stirring blade and a water separator having a reflux condenser, the glass vessel was placed in an oil bath and heated at an external temperature of 125° C. to thus azeotropically reflux volatile components within the glass vessel, and water thus separated was drawn off by the water separator. Dehydration was ended at the point when 95 mass % of water contained in the dispersion of polymer microparticles (PA-10) placed in the glass vessel had been drawn off, volatile components such as n-heptane were subsequently removed by drying and heating under reduced pressure, and powdered polymer microparticles (PA-10) were thus obtained.

(8) (i) When the average particle size (when dried) and water absorption ratio of the powdered polymer microparticles (PA-10) obtained in (7) above were measured by the above-mentioned methods, the average particle size was 18.0 μm, and the water absorption ratio was 18.5 times.

Figure 5:
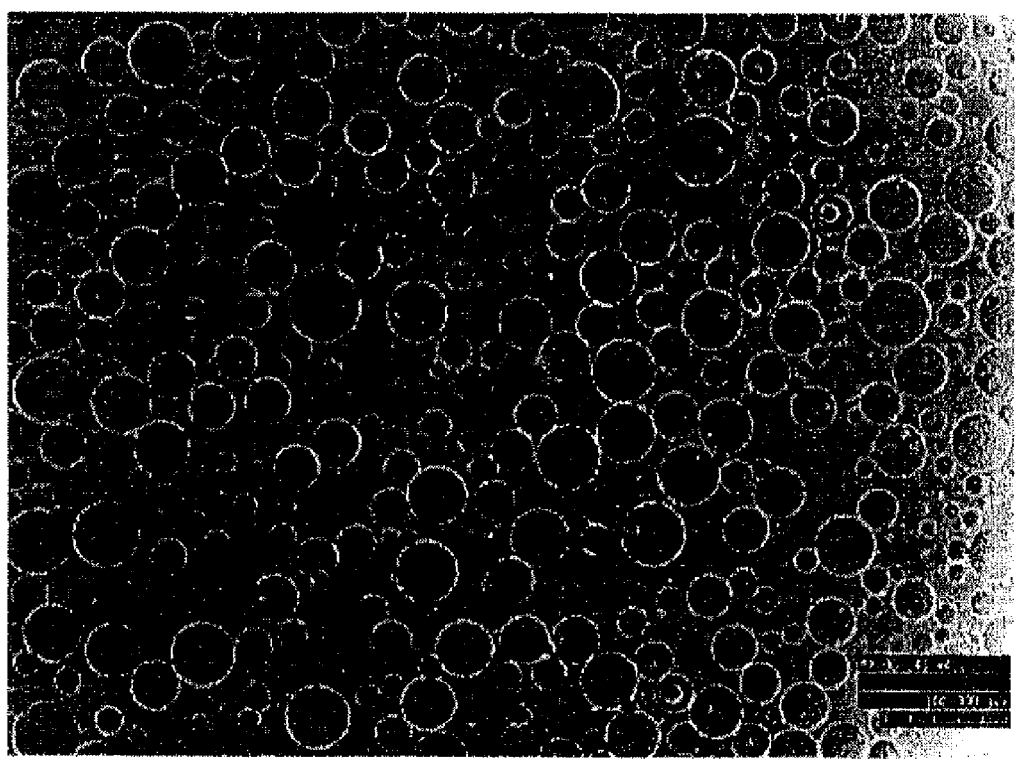
FIG. 5 is a photograph taken by a digital microscope of the polymer microparticles obtained in Example 10 in saturated water-swollen state.

(ii) The powdered polymer microparticles (PA-10) obtained in (7) above were charged into a large excess of ion-exchanged water and allowed to stand at 25° C. for 1 hour so as to make them swell up to a saturated state; this state was photographed at a magnification of 420 times using the same digital microscope as that used in (i) of (6) above, as shown in the photograph of FIG. 5, and the saturated water-swollen particles of polymer microparticles (PA-10) obtained in (7) above maintained a spherical shape and had a particle size distribution centered on around 40 μm.

(iii) The average particle size in a saturated water-swollen state of the powdered polymer microparticles (PA-10) obtained in (7) above was measured by the above-mentioned method and it was 38.3 μm.

(iv) With regard to the powdered polymer microparticles (PA-10) obtained in (7) above, when the proportion of particles having a particle size of 150 μm or greater in a saturation swollen state was determined by the above-mentioned method, the proportion of coarse particles having a particle size of 150 μm or greater in a saturated water-swollen state was the very small value of 0.07 mass %, and the particle size was uniform.

EXAMPLES 11 and 12

Production of Polymer Microparticles (PA-11) and (PA-12)

(1) When dispersions (in-oil type dispersions) of polymer microparticles (PA-11) and polymer microparticles (PA-12) were produced by the same procedures as in (1) to (5) of Example 10 except that the dispersion stabilizer was changed to those shown in Table 6, dispersions of polymer microparticles could be produced stably in the same manner as in Example 10.

(2) (i) When a portion of each of the dispersion of polymer microparticles (PA-11) and the dispersion of polymer microparticles (PA-12) obtained in (1) above was sampled and examined at a magnification of 420 times using the same digital microscope as that used in Example 10, polymer microparticles (PA-11) were formed from a group of spherical polymer microparticles having a particle size distribution centered on around 20 μm, polymer microparticles (PA-12) were also formed from a group of spherical polymer microparticles having a particle size distribution centered on around 20 μm, and aggregated particles (secondary particles) in which a plurality of polymer microparticles were fused were not observed in either of the polymer microparticles.

(ii) Furthermore, when each of the dispersion of polymer microparticles (PA-11) and the dispersion of polymer microparticles (PA-12) was taken out from the polymerization reactor, adhesion of the polymer microparticles to the interior of the polymerization reactor was visually examined, and in both cases only a few polymer microparticles adhered to the vicinity of the liquid level within the polymerization reactor and there was no adhesion to the walls of the polymerization reactor.

(iii) A portion of each of the dispersion of polymer microparticles (PA-11) and the dispersion of polymer microparticles (PA-12) obtained in (1) above was sampled, and when the amount of residue remaining on a polyethylene filter cloth (200 mesh; mesh opening 114 μm) was measured by the above-mentioned method, it was the small amount of 0.011 mass % for polymer microparticles (PA-11) and 0.019 mass % for polymer microparticles (PA-12).

(3) The remainder of each of the dispersions of polymer microparticles (PA-11) and polymer microparticles (PA-12) obtained in (1) above was treated in the same manner as in (7) of Example 10, and powdered polymer microparticles (PA-11) and polymer microparticles (PA-12) were obtained.

(4) (i) When the average particle size (when dried) and the water absorption ratio of the powdered polymer microparticles (PA-11) and polymer microparticles (PA-12) obtained in (3) above were measured by the above-mentioned methods, the average particle size of polymer microparticles (PA-11) was 19.4 μm and the water absorption ratio thereof was 19.4 times, and the average particle size of polymer microparticles (PA-12) was 20.6 μm and the water absorption ratio thereof was 20.1 times.

(ii) The powdered polymer microparticles (PA-11) and polymer microparticles (PA-12) obtained in (3) above were charged into a large excess of ion-exchanged water and allowed to stand at 25° C. for 1 hour so as to make them swell up to a saturated state, and this state was examined at a magnification of 420 times using the same digital microscope as that used in Example 10; in both cases a spherical shape was maintained, the saturated water-swollen particles of polymer microparticles (PA-11) had a particle size distribution centered on around 45 μm, and the saturated water-swollen particles of polymer microparticles (PA-12) had a particle size distribution centered on around 50 μm.

(iii) The average particle size in a saturated water-swollen state of each of powdered polymer microparticles (PA-11) and polymer microparticles (PA-12) obtained in (3) above was measured by the above-mentioned method, and it was 46.2 μm for polymer microparticles (PA-11) and 49.7 μm for polymer microparticles (PA-12).

(iv) With regard to each of powdered polymer microparticles (PA-11) and polymer microparticles (PA-12) obtained in (3) above, when the proportion of coarse particles having a particle size of 150 μm or greater in a saturation swollen state was determined by the above-mentioned method, the proportion of coarse particles having a particle size of 150 μm or greater in a saturated water-swollen state was the very small value of 0.03 mass % for polymer microparticles (PA-11) and 0.10 mass % for polymer microparticles (PA-12), and the particle size was uniform.

Figure 6:
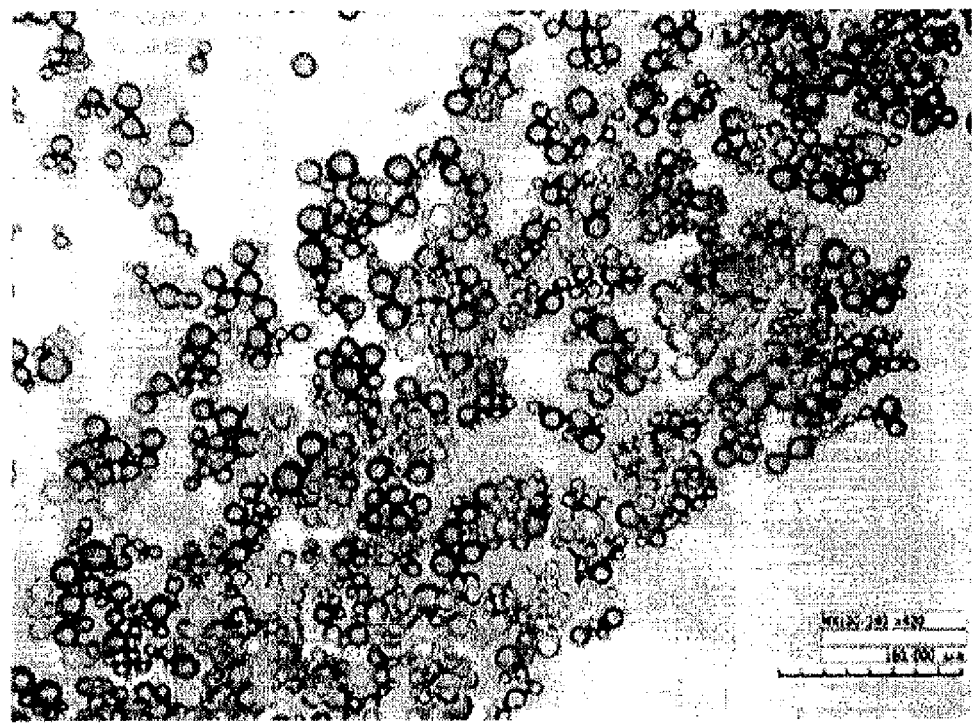
FIG. 6 is a photograph taken by a digital microscope of a dispersion of polymer microparticles obtained in Example 11.
Figure 7:
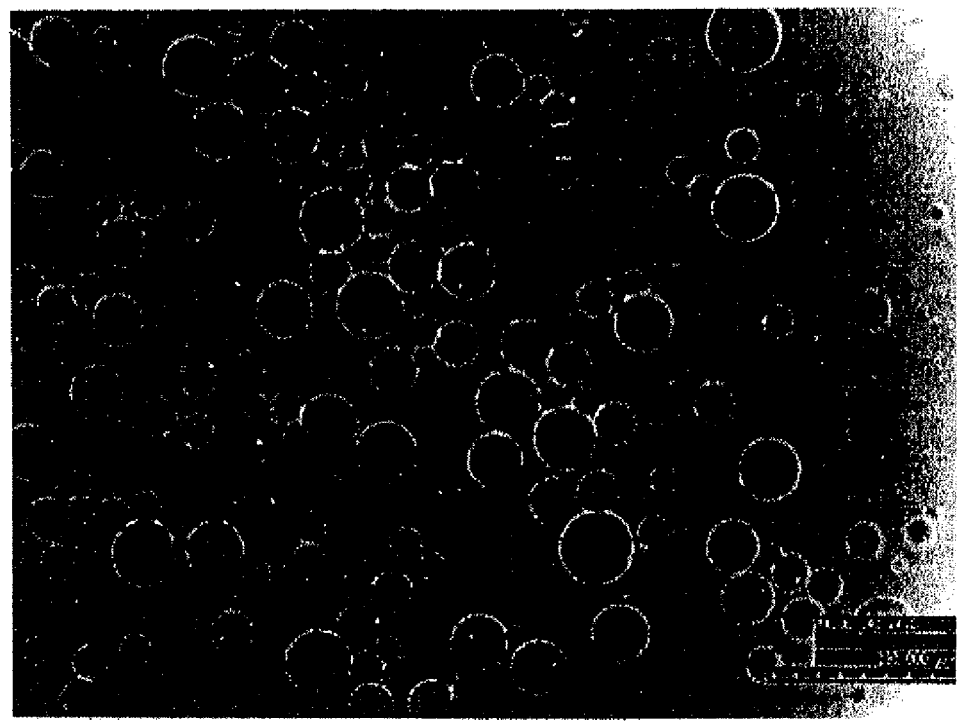
FIG. 7 is a photograph taken by a digital microscope of the polymer microparticles obtained in Example 11 in saturated water-swollen state.

(5) A digital microscope photograph (magnification 420 times) of a dispersion (in-oil dispersion) of polymer microparticles (PA-11) obtained in (1) above is shown in FIG. 6, and a digital microscope photograph (magnification 420 times) of saturated water-swollen particles of polymer microparticles (PA-11) in (ii) of (4) above is shown in FIG. 7.

EXAMPLES 13 to 15

Production of Polymer Microparticles (PA-13) to (PA-15)

(1) A dispersion of polymer microparticles (PA-13), a dispersion of polymer microparticles (PA-14), and a dispersion of polymer microparticles (PA-15) were produced by the same procedures as in (1) to (5) of Example 10 except that the type and the amount of dispersion stabilizer used, and the amount of polyethylene glycol diacrylate ('Aronix M-243' manufactured by Toagosei Co., Ltd., average molecular weight 425) used were changed as shown in Table 6 below (all of the dispersions were in-oil type dispersions). Since sorbitan monopalmitate (SP-10) used in Examples 13 to 15 had low solubility in n-heptane at low temperature, in Examples 13 to 15a polymerization reactor was charged with three types of dispersion stabilizers and n-heptane, the polymerization reactor internal temperature was then adjusted to 35° C., stirring was carried out for 1 hour, and a liquid in which the dispersion stabilizers were uniformly dissolved (dispersion stabilizer liquid; oil phase) was thus prepared. In all of Examples 13 to 15, a dispersion of polymer microparticles could be produced stably as in Example 10.

(2) (i) When a portion of each of the dispersions of polymer microparticles (PA-13) to (PA-15) obtained in (1) above was sampled and examined at a magnification of 420 times using the same digital microscope as that used in Example 10, polymer microparticles (PA-13) were formed from a group of spherical polymer microparticles having a particle size distribution centered on around 20 μm, polymer microparticles (PA-14) were formed from a group of spherical polymer microparticles having a particle size distribution centered on around 20 μm, polymer microparticles (PA-15) were formed from a group of spherical polymer microparticles having a particle size distribution centered on around 15 μm, and aggregated particles (secondary particles) in which a plurality of polymer microparticles were fused were not observed in any of the polymer microparticles.

(ii) Furthermore, when each of the dispersions of polymer microparticles (PA-13) to (PA-15) was taken out from the polymerization reactor, adhesion of the polymer microparticles to the interior of the polymerization reactor was visually examined; in all cases only a few polymer microparticles adhered to the vicinity of the liquid level within the polymerization reactor, and there was no adhesion to the walls of the polymerization reactor.

(iii) When a portion of each of the dispersions of polymer microparticles (PA-13) to (PA-15) obtained in (1) above was sampled and the amount of residue remaining on a polyethylene filter cloth (200 mesh; mesh opening 114 μm) was measured by the above-mentioned method, it was the small amount of 0.019 mass % for polymer microparticles (PA-13), 0.014 mass % for polymer microparticles (PA-14), and 0.024 mass % for polymer microparticles (PA-15), and the content of coarse particles was very small.

(3) The remainder of each of polymer microparticles (PA-13) to (PA-15) obtained in (1) above was treated in the same manner as in (7) of Example 10, and powdered polymer microparticles (PA-13) to (PA-15) were obtained.

(4) (i) When the average particle size (when dried) and the water absorption ratio of the powdered polymer microparticles (PA-13) to (PA-15) obtained in (3) above were measured by the above-mentioned methods, the average particle size of polymer microparticles (PA-13) was 20.7 μm and the water absorption ratio thereof was 24.7 times, the average particle size of polymer microparticles (PA-14) was 18.5 μm and the water absorption ratio thereof was 19.0 times, and the average particle size of polymer microparticles (PA-15) was 14.2 μm and the water absorption ratio thereof was 17.1 times.

(ii) The powdered polymer microparticles (PA-13) to (PA-15) obtained in (3) above were charged into a large excess of ion-exchanged water and allowed to stand at 25° C. for 1 hour so as to make them swell up to a saturated state, this state was examined at a magnification of 420 times using the same digital microscope as that used in Example 10, and in all cases a spherical shape was maintained; the saturated water-swollen particles of polymer microparticles (PA-13) had a particle size distribution centered on around 50 μm, the saturated water-swollen particles of polymer microparticles (PA-14) had a particle size distribution centered on around 40 μm, and the saturated water-swollen particles of polymer microparticles (PA-15) had a particle size distribution centered on around 30 μm.

(iii) The average particle size in a saturated water-swollen state of each of the powdered polymer microparticles (PA-13) to (PA-15) obtained in (3) above was measured by the above-mentioned method, and it was 44.5 μm for polymer microparticles (PA-13), 38.1 μm for polymer microparticles (PA-14), and 33.1 μm for polymer microparticles (PA-15).

(iv) With regard to each of the powdered polymer microparticles (PA-13) to (PA-15) obtained in (3) above, when the proportion of coarse particles having a particle size of 150 μm or greater in a saturation swollen state was determined by the above-mentioned method, the proportion of coarse particles having a particle size of 150 μm or greater in a saturated water-swollen state was the very small value of 0.00 mass % for all of polymer microparticles (PA-13), polymer microparticles (PA-14), and polymer microparticles (PA-15), and the particle size was uniform.

COMPARATIVE EXAMPLE 10

Production of Polymer Microparticles PB-10

When a dispersion of polymer microparticles (PB-10) was produced by the same procedures as in (1) to (5) of Example 10 except that 5.0 parts by mass of sorbitan monooleate ('RHEODOL AO-10' manufactured by Kao Corporation, emulsifier for w/o type emulsion, HLB=4.3) alone was used as a dispersion stabilizer, very large aggregated lumps were formed at the same time as polymerization started, and a dispersion of polymer microparticles could not be produced.

TABLE 6

| | Example | | | | | | Comparative |
|---|---|---|---|---|---|---|---|
| | 10 | 11 | 12 | 13 | 14 | 15 | Example 10 |
| Polymer microparticle code | PA-10 | PA-11 | PA-12 | PA-13 | PA-14 | PA-15 | PB-10 |
| [Monomer composition (parts by mass)] | | | | | | | |
| Acrylic acid | 100.0 | 100.0 | 100.0 | 100.0 | 100.0 | 100.0 | 100.0 |
| Polyethylene glycol diacrylate | 14.8 | 14.8 | 14.8 | 10.6 | 13.6 | 17.7 | 14.8 |
| (mol % relative to Acrylic acid) | (2.5) | (2.5) | (2.5) | (1.8) | (2.3) | (3.0) | (2.5) |
| [Dispersion stabilizer] | | | | | | | |
| Dispersion stabilizer (1) Type[1] | M-1 | M-6 | M-7 | M-1 | M-1 | M-1 | |
| Amount used (parts by mass) | 5.0 | 5.0 | 5.0 | 1.4 | 1.4 | 1.4 | |
| Dispersion stabilizer (2) Type[1] | | | | AO-10 | AO-10 | AO-10 | AO-10 |
| Amount used (parts by mass) | | | | 2.0 | 2.0 | 2.0 | 5.0 |
| Dispersion stabilizer (3) Type[1] | | | | SP-P10 | SP-P10 | SP-P10 | |
| Amount used (parts by mass) | | | | 3.0 | 3.0 | 3.0 | |
| [Polymer microparticles] | | | | | | | |
| Extent of adhesion of polymer microparticles[2] | A | A | A | A | A | A | —[3] |
| Amount of residue on polyethylene filter cloth (mass %) | 0.067 | 0.011 | 0.019 | 0.019 | 0.014 | 0.024 | —[3] |
| Average particle size (μm) | 18.0 | 19.4 | 20.6 | 20.7 | 18.5 | 14.2 | —[3] |
| Water absorption ratio (times) | 18.5 | 19.4 | 20.1 | 24.7 | 19.0 | 17.1 | —[3] |
| Average particle size in saturated water-swollen state (μm) | 38.3 | 46.2 | 49.7 | 44.5 | 38.1 | 33.1 | —[3] |
| Proportion of particles having particle size of 150 μm or greater[4] (mass %) | 0.07 | 0.03 | 0.10 | 0.00 | 0.00 | 0.00 | —[3] |

[1]Dispersion stabilizer:
M-1: Macromonomer M-1 produced in Production Example 1
M-6: Macromonomer M-6 produced in Production Example 6
M-7: Macromonomer M-7 produced in Production Example 7
AO-10: sorbitan monooleate ('RHEODOL AO-10' manufactured by Kao Corporation)
SP-P10: sorbitan monopalmitate ('RHEODOL SP-P10' manufactured by Kao Corporation)
[2]Extent of polymer microparticles adhering to polymerization reactor
[3]Large aggregates formed at the same time as polymerization started, dispersion of polymer microparticles could not be obtained.
[4]Proportion of particles having a particle size of 150 μm or greater in saturated water-swollen state.

As seen in the results of Examples 10 to 15 in Table 6 above, in Examples 10 to 15 in which hydrophilic (water-swelling) polymer microparticles were produced by inverse phase suspension polymerization using a macromonomer having a radically polymerizable unsaturated group at a terminus of a vinyl-based monomer-derived polymer [specifically, macromonomers (M-1, M-6, and M-7)] as a dispersion stabilizer, hydrophilic crosslinked polymer microparticles having an appropriate particle size of on the order of a few μm to a few tens of μm with uniform particle size, having excellent water absorbability, and being capable of dispersing well as individual primary particles without forming secondary particles due to aggregation of the particles themselves in water while maintaining a spherical shape when swollen by water absorption could be obtained.

In contrast thereto, as seen in the results of Comparative Example 10 of Table 6 above, in Comparative Example 10 in which, when carrying out inverse phase suspension polymerization of a hydrophilic vinyl-based monomer, a macromonomer having a radically polymerizable unsaturated group at a terminus of a vinyl-based monomer-derived polymer was not used as a dispersion stabilizer, aggregation occurred immediately after polymerization started, and inverse phase suspension polymerization could not be carried out in practice.

Industrial Applicability

In accordance with the process of the present invention, high quality spherical polymer microparticles having an appropriate particle size of on the order of a few μm to a few tens of μm, generally 2 to 100 μm, with uniform particle size can be produced with good productivity while maintaining high dispersion stability and polymerization stability without causing aggregation of polymer particles, clumping thereof, adhesion thereof to polymerization equipment, etc. during polymerization or after polymerization.

The polymer microparticles obtained by the process of the present invention, in particular hydrophilic crosslinked polymer microparticles obtained by the process of the present invention, are useful as cosmetic additives, supports for various chemical materials, spacers, column packings for chromatography, light diffusion agents, porosification agents, weight-lightening agents, antiblocking agents, and surface modification agents for recording paper.

The invention claimed is:

1. A process for producing hydrophilic polymer microparticles by inverse phase suspension polymerization of a vinyl-based monomer,
the inverse phase suspension polymerization of the vinyl-based monomer being carried out using as a dispersion stabilizer a macromonomer having a radically polymerizable unsaturated group at a terminus of a vinyl-based monomer-derived polymer,
wherein the macromonomer contains a hydrophobic vinyl-based monomer-derived constituent unit and a hydrophilic vinyl-based monomer-derived constituent unit,
wherein at least some of the hydrophobic vinyl-based monomer-derived constituent units are derived from an 8 or more carbons alkyl ester of (meth)acrylic acid,
wherein at least some of the hydrophilic vinyl-based monomer-derived constituent units are derived from a carboxy group-containing vinyl monomer, and
wherein at least some of the vinyl-based monomer used in the inverse phase suspension polymerization is at least one type selected from (meth)acrylic acid and (meth)acrylamido-2-methylpropanesulfonic acid.

2. The production process according to claim 1,
wherein the macromonomer used as a dispersion stabilizer is a macromonomer having an α-substituted vinyl group represented by Formula (I) below

wherein X denotes a monovalent polar group at the terminus of the vinyl-based monomer-derived polymer, which is obtained by radical polymerization at 150° C. to 350° C. of the vinyl-based macromonomer forming monomer, the vinyl-based macromonomer forming monomer being a starting material for production of the macromonomer.

3. The production process according to claim 1,
wherein the macromonomer used as a dispersion stabilizer is a macromonomer having a (meth)acryloyl group at the terminus of the vinyl-based monomer-derived polymer.

4. The production process according to claim 1,
wherein the macromonomer used as a dispersion stabilizer has a weight average molecular weight of 1000 to 30000.

5. The production process according to claim 1,
wherein the polymer microparticles produced by suspension polymerization have an average particle size of 2 to 100 μm.

6. The production process according to claim 1,
wherein crosslinked polymer microparticles are produced using as vinyl-based monomers for inverse phase suspension polymerization a monofunctional vinyl-based monomer and a polyfunctional vinyl-based monomer at a molar ratio of monofunctional vinyl-based monomer:polyfunctional vinyl-based monomer=100:0.1 to 100.

7. The production process according to claim 1,
wherein at least some of the vinyl-based monomer used in the inverse phase suspension polymerization is a vinyl-based monomer having a polar group selected from a carboxyl group, a sulfonic acid group, and an amido group.

8. The production process according to claim 1,
wherein the hydrophilic polymer microparticles produced by the inverse phase suspension polymerization are polymer microparticles having a water absorption ratio of 5 to 50 times, an average particle size in a saturated water-swollen state of 5 to 70 μm, and a content ratio of particles having a particle size of 150 μm or greater in a saturated water-swollen state of no greater than 0.3 mass %.

9. The production process according to claim 1,
wherein the macromonomer contains the 8 or more carbons alkyl ester of (meth)acrylic acid-derived constituent unit as a hydrophobic vinyl-based, monomer unit at a proportion of 30 to 99 mass % and the vinyl-based monomer-derived constituent unit having a carboxyl group as a hydrophilic vinyl-based monomer unit at a proportion of 70 to 1 mass %, based on the total mass of the macromonomer.

10. The production process according to claim 9,
wherein the macromonomer contains the 8 or more carbons alkyl ester of (meth)acrylic acid-derived constituent unit as a hydrophobic vinyl-based monomer unit at a proportion of 60 to 90 mass % and the vinyl-based monomer-derived constituent unit having a carboxyl group as a hydrophilic vinyl-based monomer unit at a proportion of 40 to 10 mass %, based on the total mass of the macromonomer.

11. The production process according to claim 6,
wherein crosslinked polymer microparticles are produced at a molar ratio of total monofunctional vinyl-based monomer: total polyfunctional vinyl-based monomer=100.05 to 10.

12. The production process according to claim 1,
wherein the hydrophobic vinyl-based monomer-derived constituent units are derived from an alkyl ester of (meth)acrylic acid selected from the group consisting of lauryl methacrylate, lauryl acrylate and stearyl methacrylate, and
wherein the hydrophilic vinyl-based monomer-derived constituent units are derived from acrylic acid.

13. The production process according to claim 11,
wherein crosslinked polymer microparticles are produced using a monofunctional vinyl-based monomer selected from the group consisting of a (partially) alkali-neutralized form of (meth)acrylic acid and a (partially) alkali-neutralized form 2-acrylamido-2-methylpropanesulfonic acid.

14. The production process according to claim 13,
wherein crosslinked polymer microparticles are produced using a polyfunctional vinyl-based monomer selected from the group consisting of polyethylene glycol diacrylate and methylenebisacrylamide.

\* \* \* \* \*